US012682095B2

(12) United States Patent　　　　　(10) Patent No.:　US 12,682,095 B2

Taillefer et al.　　　　　　　　　　　(45) Date of Patent:　　　Jul. 14, 2026

(54) PLUGGABLE DATA TAXONOMY AND PROCESSING

(71) Applicant: Microsoft Technology Licensing, LLC, Redmond, WA (US)

(72) Inventors: Martin Taillefer, Redmond, WA (US); Rafal Mzyk, Kluczbork (PL); Andrey Noskov, Prague (CZ); Ján Guttek, Prague (CZ); Scott Allen Thurlow, Bellevue, WA (US); Stephen Toub, Winchester, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 380 days.

(21) Appl. No.: 18/318,461

(22) Filed: May 16, 2023

(65) Prior Publication Data

US 2024/0386122 A1　　Nov. 21, 2024

(51) Int. Cl.
| | |
|---|---|
| *G06F 21/62* | (2013.01) |
| *G06F 21/56* | (2013.01) |
| *G06F 40/169* | (2020.01) |

(52) U.S. Cl.
CPC ........ *G06F 21/6218* (2013.01); *G06F 21/563* (2013.01); *G06F 40/169* (2020.01)

(58) Field of Classification Search
CPC ... G06F 21/563; G06F 21/6218; G06F 40/169
See application file for complete search history.

(56) References Cited

U.S. PATENT DOCUMENTS

| | | | |
|---|---|---|---|
| 9,621,539 B2 * | 4/2017 | Shawn | .................. H04L 9/3252 |
| 10,922,292 B2 * | 2/2021 | Dawson | .................. G06F 21/45 |

(Continued)

FOREIGN PATENT DOCUMENTS

| | | |
|---|---|---|
| EP | 3933632 A1 | 1/2022 |

OTHER PUBLICATIONS

International Search Report and Written Opinion received for PCT Application No. PCT/US2024/026711, Aug. 23, 2024, 21 pages.

(Continued)

*Primary Examiner* — Gary S Gracia

(74) *Attorney, Agent, or Firm* — Wade IP Law PLLC

(57)　　　　　　　ABSTRACT

A taxonomy-agnostic data protection framework includes a plugged-in data classification taxonomy definition having a taxonomy identifier and a set of data classification indicators. The taxonomy-agnostic data protection framework also includes a plugged-in set of data classification processing routines, and a plugged-in mapping mechanism which maps between data classification processing routines and data classification indicators. The framework facilitates efficient, accurate, and thorough implementation of data classification propagation per the plugged-in taxonomy, both within a given program and between programs that connect over a network. The framework also facilitates flexible implementation of per-taxonomy data protection actions such as deletion, redaction, encryption, anonymization, pseudonymization, hashing, or enrichment, in response to individual or combined data classification indicators. Static analysis of annotated source code determines whether data classifications are accurately and comprehensively propagated with a program.

27 Claims, 3 Drawing Sheets

ENHANCED COMPUTING SYSTEM <u>102, 202</u> WITH FUNCTIONALITY <u>204</u> TO ACCESS <u>206</u> TAXONOMY-AGNOSTIC <u>208</u> PROTECTION <u>210</u> FRAMEWORK <u>212</u>

STATIC ANALYSIS <u>214</u> TOOL <u>220</u>

DATA CLASSIFICATION PROCESSING ROUTINES <u>216</u>, MAPPING MECHANISM <u>218</u>

(56) References Cited

U.S. PATENT DOCUMENTS

| | | | | |
|---|---|---|---|---|
| 11,367,289 | B1 * | 6/2022 | Widjaja | G06T 7/11 |
| 11,470,084 | B2 * | 10/2022 | Mital | H04L 63/101 |
| 11,914,993 | B1 * | 2/2024 | Garg | G06F 8/77 |
| 12,040,083 | B2 * | 7/2024 | Mohtar | G06F 40/174 |
| 12,223,090 | B2 * | 2/2025 | Townsend | G06F 21/6245 |
| 2012/0331284 | A1 * | 12/2012 | Kouladjie | H04L 9/088 |
| | | | | 713/153 |
| 2013/0073387 | A1 * | 3/2013 | Heath | G06Q 30/02 |
| | | | | 705/14.53 |
| 2015/0195086 | A1 * | 7/2015 | Davison | G06F 21/602 |
| | | | | 713/168 |
| 2017/0153971 | A1 * | 6/2017 | Fan | G06F 11/3692 |
| 2018/0004859 | A1 * | 1/2018 | Piechowicz | G06F 16/9024 |
| 2018/0276401 | A1 | 9/2018 | Allen | |
| 2018/0352001 | A1 * | 12/2018 | Barday | G06Q 10/06 |
| 2019/0164062 | A1 * | 5/2019 | Moura | G06N 5/022 |
| 2019/0171846 | A1 | 6/2019 | Conikee | |
| 2019/0222566 | A1 * | 7/2019 | Trimmer | H04L 63/061 |
| 2020/0184282 | A1 * | 6/2020 | Sutton | G06V 10/764 |
| 2020/0195425 | A1 * | 6/2020 | Mistry | H04L 63/123 |
| 2020/0410116 | A1 * | 12/2020 | Williamson | G06N 20/00 |
| 2021/0209159 | A1 * | 7/2021 | Mahanta | G06N 20/00 |
| 2021/0256036 | A1 * | 8/2021 | Luo | G06F 16/285 |
| 2021/0256420 | A1 * | 8/2021 | Elisha | G06N 20/00 |
| 2021/0385232 | A1 * | 12/2021 | Kutt | G06N 3/09 |
| 2022/0046057 | A1 * | 2/2022 | Kutt | G06N 3/0985 |
| 2022/0083332 | A1 * | 3/2022 | Ravindranath | G06F 8/43 |
| 2022/0312661 | A1 * | 10/2022 | Acedo | G16B 40/00 |
| 2023/0128136 | A1 * | 4/2023 | Sahu | G06F 21/6245 |
| | | | | 726/26 |
| 2023/0153526 | A1 * | 5/2023 | Wang | G06N 3/084 |
| | | | | 704/9 |
| 2023/0195924 | A1 * | 6/2023 | Barnes | G06F 16/24552 |
| | | | | 726/26 |
| 2023/0352055 | A1 * | 11/2023 | Bv | H04N 21/8405 |
| 2024/0177288 | A1 * | 5/2024 | Senn | G06T 7/0004 |
| 2024/0211504 | A1 * | 6/2024 | Jeong | G06N 3/045 |
| 2024/0386122 | A1 * | 11/2024 | Taillefer | G06F 21/6218 |
| 2025/0390399 | A1 * | 12/2025 | Antonopoulos | G06F 11/1469 |

OTHER PUBLICATIONS

Rath, et al., "Usable Privacy-Aware Logging for Unstructured Log Entries", IEEE, Aug. 31, 2016, pp. 272-277.

"Cloud computing and distributed platforms—Data flow, data categories and data use—", International Standard ISO/IEC 19944-1, First edition Oct. 2020, no later than Dec. 31, 2020, 74 pages.

"Protocol Buffers Documentation: Overview", retrieved from << https://protobuf.dev/overview/ >>, no later than Apr. 25, 2023, 5 pages.

"Guidance Regarding Methods for De-identification of Protected Health Information in Accordance with the Health Insurance Portability and Accountability Act (HIPAA) Privacy Rule", retrieved from << https://www.hhs.gov/hipaa/for-professionals/privacy/special-topics/de-identification/index.html >>, no later than Apr. 25, 2023, 32 pages.

"BitArray Class", retrieved from << https://learn.microsoft.com/en-us/dotnet/api/system.collections.bitarray?view=net-7.0 >>, no later than Apr. 25, 2023, 7 pages.

"BitVector32 Struct", retrieved from << https://learn.microsoft.com/en-us/dotnet/api/system.collections.specialized.bitvector32?view=net-7.0 >>, no later than Apr. 25, 2023, 6 pages.

"Interface description language", retrieved from << https://en.wikipedia.org/wiki/Interface_description_language >>, Apr. 25, 2023, 2 pages.

"XSLT", retrieved from << https://en.wikipedia.org/wiki/XSLT >>, Feb. 10, 2023, 10 pages.

"Data classification (data management)", retrieved from << https://en.wikipedia.org/wiki/Data_classification_(data_management) >>, Apr. 30, 2023, 4 pages.

"Data management", retrieved from << https://en.wikipedia.org/wiki/Data_management >>, Apr. 25, 2023, 4 pages.

"Data governance", retrieved from << https://en.wikipedia.org/wiki/Data_governance >>, Feb. 25, 2023, 4 pages.

"Data security", retrieved from << https://en.wikipedia.org/wiki/Data_security >>, Jan. 19, 2023, 5 pages.

"Overview of source code analysis", retrieved from << https://learn.microsoft.com/en-us/visualstudio/code-quality/roslyn-analyzers-overview?view=vs-2022 >>, Mar. 9, 2023, 5 pages.

"Static program analysis", retrieved from << https://en.wikipedia.org/wiki/Static_program_analysis >>, May 1, 2023, 6 pages.

"DataClassification Option Type", retrieved from << https://learn.microsoft.com/fr-fr/dynamics365/business-central/dev-itpro/developer/methods-auto/dataclassification/dataclassification-option?view=dynamicsnav-ps-2018 >>, Jun. 14, 2022, 1 page.

International Preliminary Report on Patentability (Chapter I) received for PCT Application No. PCT/US2024/026711, Mailed on Nov. 27, 2025, 13 Pages.

* cited by examiner

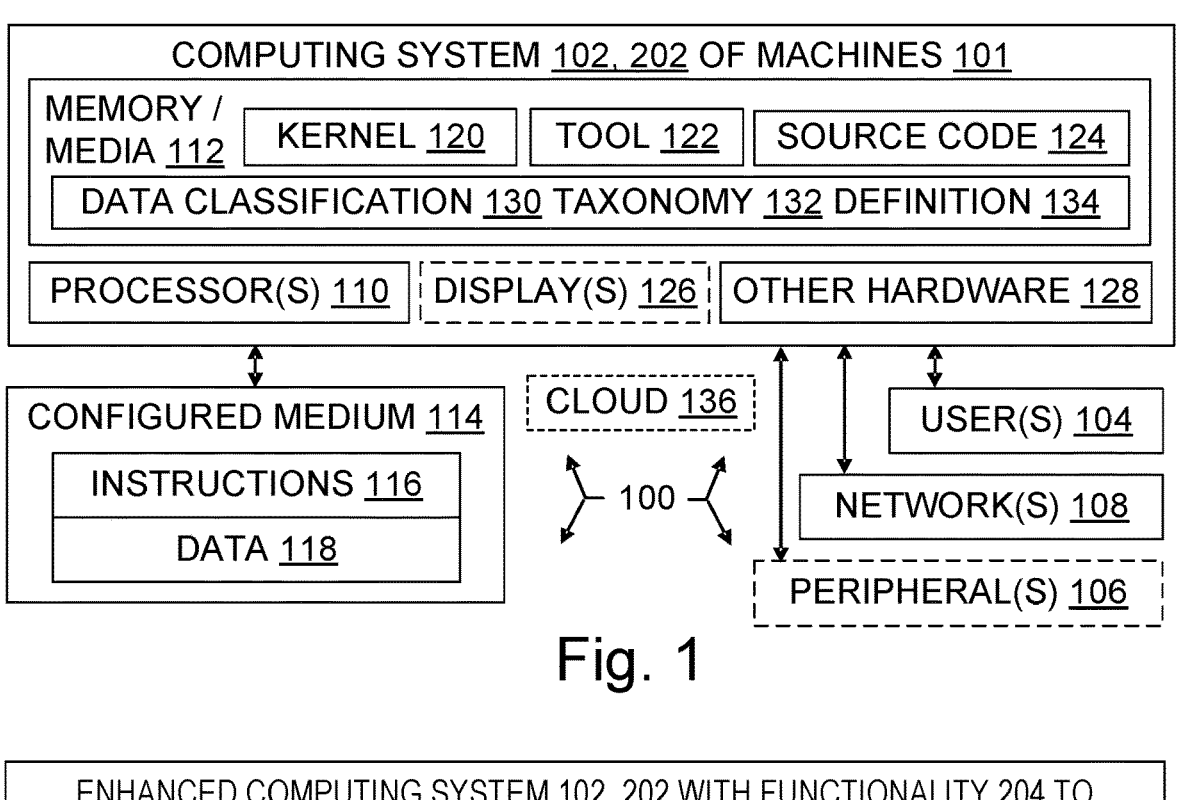
Fig. 1
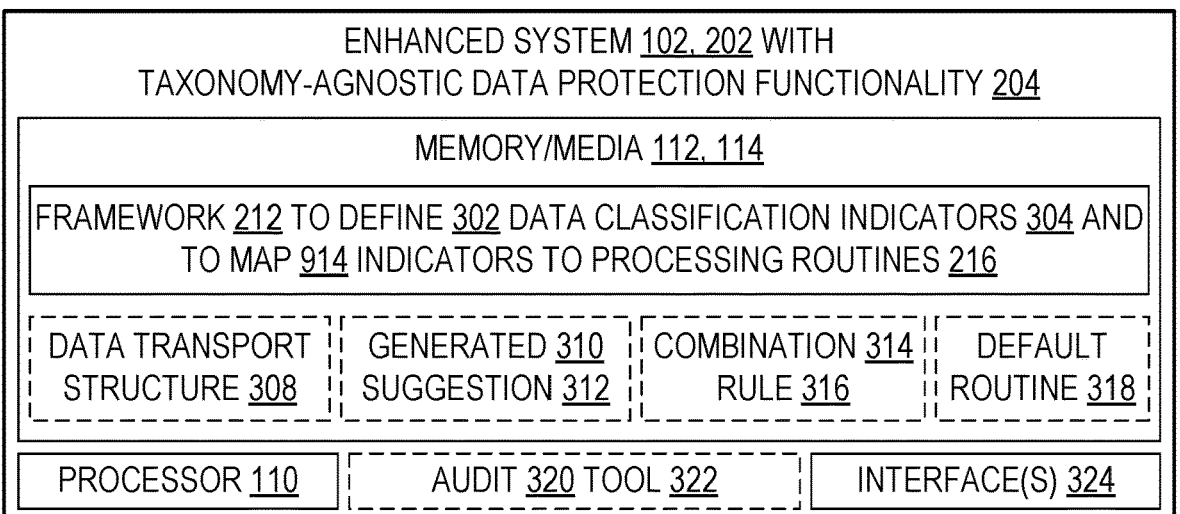
Fig. 2
ENHANCED SYSTEM 102, 202 WITH
TAXONOMY-AGNOSTIC DATA PROTECTION FUNCTIONALITY 204
MEMORY/MEDIA 112, 114
FRAMEWORK 212 TO DEFINE 302 DATA CLASSIFICATION INDICATORS 304 AND
TO MAP 914 INDICATORS TO PROCESSING ROUTINES 216
| DATA TRANSPORT STRUCTURE 308 | GENERATED 310 SUGGESTION 312 | COMBINATION 314 RULE 316 | DEFAULT ROUTINE 318 |
| PROCESSOR 110 | AUDIT 320 TOOL 322 | INTERFACE(S) 324 |
Fig. 3

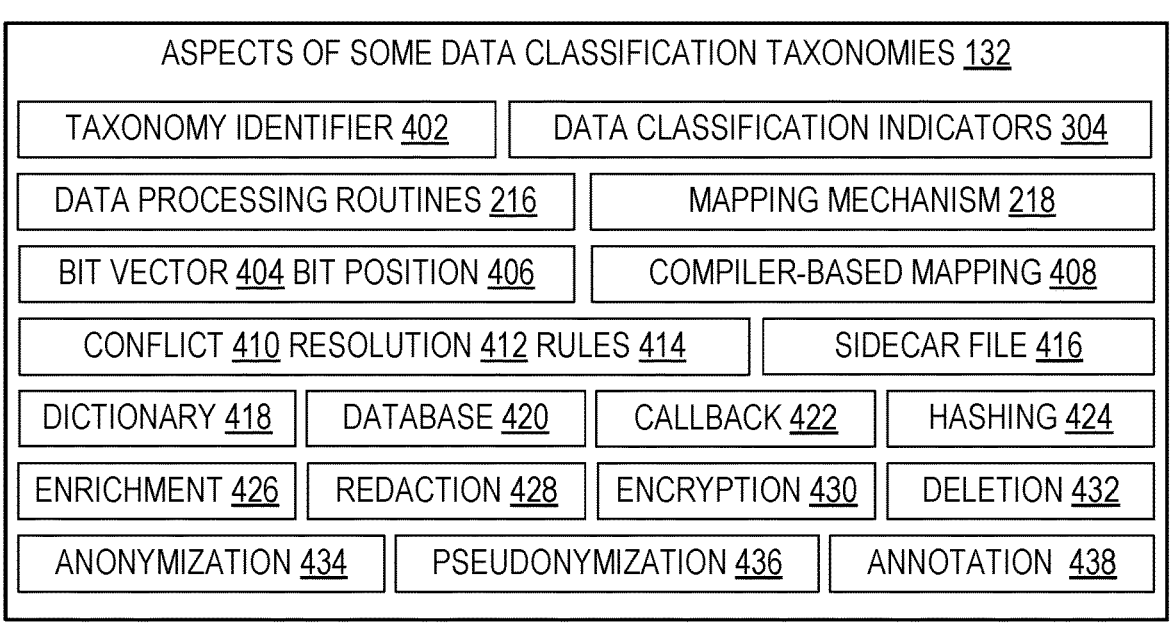

ASPECTS OF SOME DATA CLASSIFICATION TAXONOMIES 132

TAXONOMY IDENTIFIER 402　　DATA CLASSIFICATION INDICATORS 304

DATA PROCESSING ROUTINES 216　　MAPPING MECHANISM 218

BIT VECTOR 404 BIT POSITION 406　　COMPILER-BASED MAPPING 408

CONFLICT 410 RESOLUTION 412 RULES 414　　SIDECAR FILE 416

DICTIONARY 418　DATABASE 420　CALLBACK 422　HASHING 424

ENRICHMENT 426　REDACTION 428　ENCRYPTION 430　DELETION 432

ANONYMIZATION 434　PSEUDONYMIZATION 436　ANNOTATION 438

Fig. 4

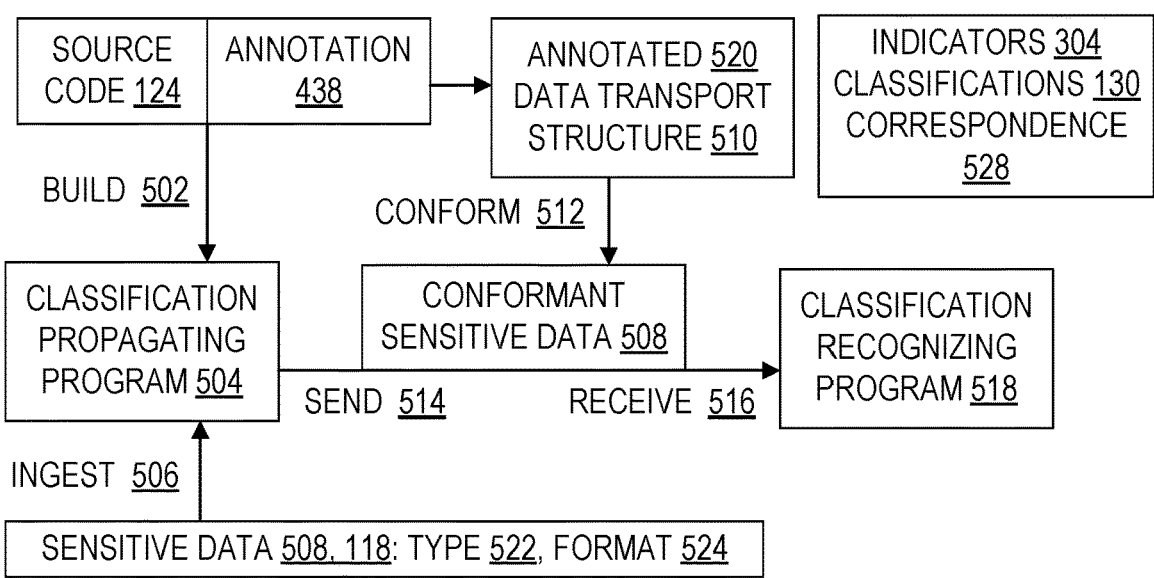

SOURCE CODE 124　ANNOTATION 438

ANNOTATED 520 DATA TRANSPORT STRUCTURE 510

INDICATORS 304 CLASSIFICATIONS 130 CORRESPONDENCE 528

BUILD 502

CONFORM 512

CLASSIFICATION PROPAGATING PROGRAM 504

CONFORMANT SENSITIVE DATA 508

CLASSIFICATION RECOGNIZING PROGRAM 518

SEND 514　　RECEIVE 516

INGEST 506

SENSITIVE DATA 508, 118: TYPE 522, FORMAT 524

Fig. 5

FRONT-END 602 OF DATA PROTECTION FRAMEWORK 212

DATA CLASSIFICATION TAXONOMY DEFINITION 134

BACK-END 604 OF DATA PROTECTION FRAMEWORK 212

MAPPING MECHANISM 218, PROCESSING ROUTINES 216

Fig. 6

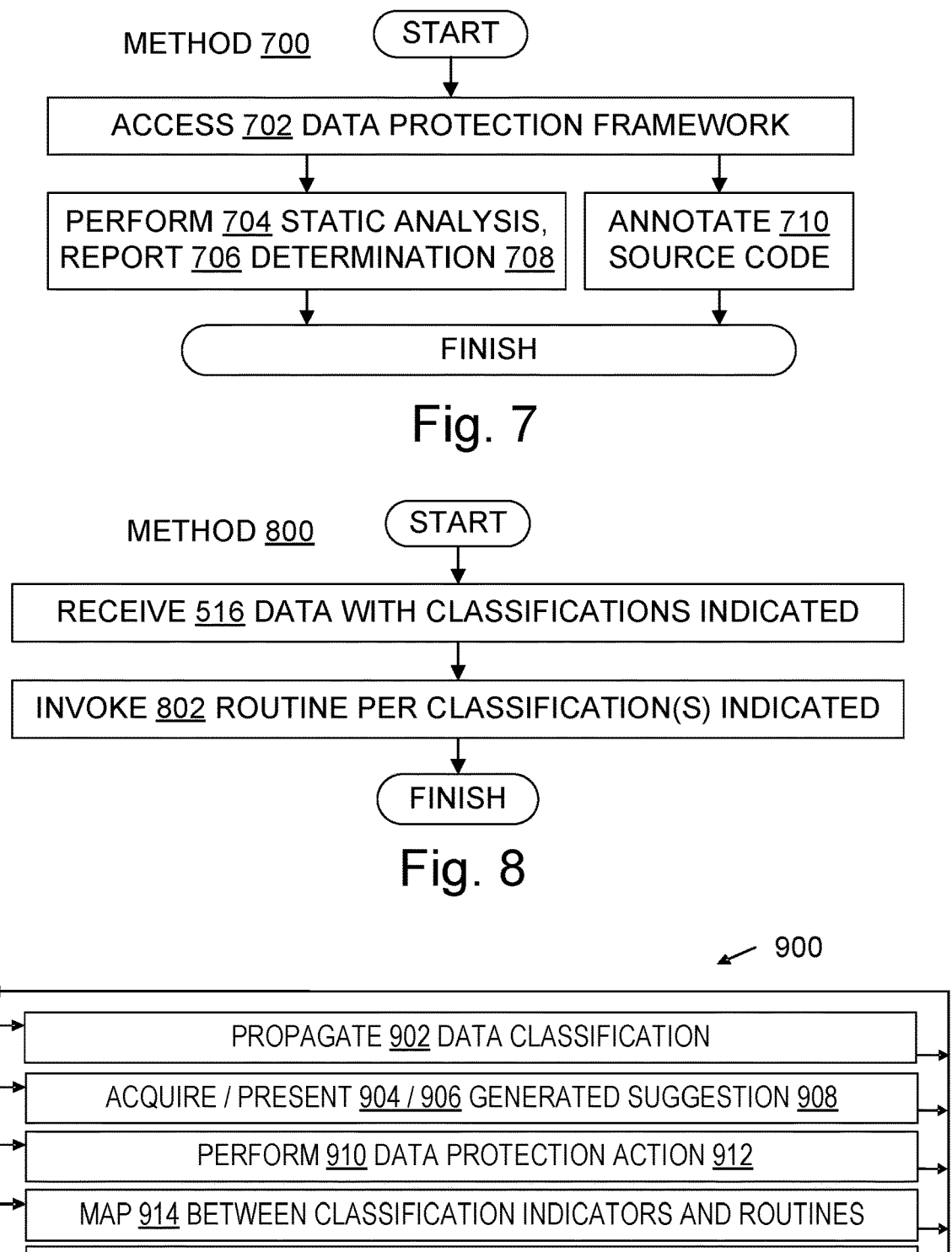

METHOD 700

START

ACCESS 702 DATA PROTECTION FRAMEWORK

PERFORM 704 STATIC ANALYSIS, REPORT 706 DETERMINATION 708

ANNOTATE 710 SOURCE CODE

FINISH

Fig. 7

METHOD 800

START

RECEIVE 516 DATA WITH CLASSIFICATIONS INDICATED

INVOKE 802 ROUTINE PER CLASSIFICATION(S) INDICATED

FINISH

PROPAGATE 902 DATA CLASSIFICATION

ACQUIRE / PRESENT 904 / 906 GENERATED SUGGESTION 908

PERFORM 910 DATA PROTECTION ACTION 912

MAP 914 BETWEEN CLASSIFICATION INDICATORS AND ROUTINES

APPLY 916 DATA CLASSIFICATION TO DATA

ANY STEP OF FIGURE 7 OR FIGURE 8

ANY OTHER STEP 918 TAUGHT IN TEXT OR DRAWINGS

Fig. 9

PLUGGABLE DATA TAXONOMY AND PROCESSING

BACKGROUND

Data is sometimes divided into categories according to criteria such as geographical or jurisdictional limits, regulatory compliance requirements, applicable privacy controls, applicable security controls, responsible department or agency or other entity, and subject matter. The data management process of assigning one or more categories to data is sometimes called "data classification", which results in classified data. The phrase "classified data" is also used in a narrower sense to describe data that is categorized by a government according to secrecy levels, e.g., classified as top secret.

Data classification is done manually, or with the assistance of software tools. For example, some data classification tools scan data files looking for matches to particular data formats such as an email address format, a credit card number format, or a government identification number format.

Data management topics such as data classification, data governance, data security, and others, have been studied for years. However, improvements in data management are still possible and worthwhile.

SUMMARY

Some embodiments described herein provide or utilize a taxonomy-agnostic data protection framework in a computing system. The taxonomy-agnostic data protection framework includes a plugged-in data classification taxonomy definition having a taxonomy identifier and a set of data classification indicators. The taxonomy-agnostic data protection framework also includes a plugged-in set of data classification processing routines, and a plugged-in mapping mechanism which maps between data classification processing routines and data classification indicators. The framework facilitates efficient, accurate, and thorough implementation of data classification propagation per the plugged-in taxonomy, both within a given program and between programs that connect over a network. The framework also facilitates flexible implementation of per-taxonomy data protection actions such as deletion, redaction, encryption, anonymization, pseudonymization, hashing, or enrichment, in response to individual or combined data classification indicators.

Other technical activities and characteristics pertinent to teachings herein will also become apparent. The examples given are merely illustrative. This Summary is not intended to identify key features or essential features of the claimed subject matter, nor is it intended to be used to limit the scope of the claimed subject matter. Rather, this Summary is provided to introduce-in a simplified form-some technical concepts that are further described below in the Detailed Description. Advances are defined with claims as properly understood, and to the extent this Summary conflicts with the claims, the claims should prevail.

BRIEF DESCRIPTION OF THE DRAWINGS

A more particular description will be given with reference to the attached drawings. These drawings only illustrate selected aspects and thus do not fully determine coverage or scope.

FIG. 1 is a diagram illustrating aspects of computer systems and also illustrating configured storage media, including some aspects included within systems that provide taxonomy-agnostic data protection functionality;

FIG. 2 is a block diagram illustrating an enhanced system configured with a taxonomy-agnostic data protection functionality;

FIG. 3 is a block diagram illustrating aspects of a system enhanced with a taxonomy-agnostic data protection functionality;

FIG. 4 is a block diagram illustrating some aspects of some data classification taxonomies;

FIG. 5 is a data flow diagram illustrating some aspects of data classification propagation;

FIG. 6 is a block diagram illustrating some architectural aspects of a taxonomy-agnostic data protection framework;

FIG. 7 is a flowchart illustrating steps in a front-end data protection method;

FIG. 8 is a flowchart illustrating steps in a back-end data protection method; and FIG. 9 is a flowchart further illustrating steps in some data protection methods, and incorporating FIG. 7 and FIG. 8.

DETAILED DESCRIPTION

Overview

Innovations may expand beyond their origins, but understanding an innovation's origins can help one more fully appreciate aspects of an innovation. In the present case, some teachings described herein were motivated by technical challenges faced by Microsoft innovators who were working to improve redaction technology for use with logging. One motivation was to protect private identity information without preventing correlation of actions to respective users, but teachings herein also have wider applicability.

Redaction technology implicates data classification, in the sense that redaction mechanisms rely on some kind of data classification in order to determine which data to redact. In some scenarios, classifying data (a.k.a. state) includes annotating specific pieces of state, e.g., telemetry data, to enable special treatment as the state travels through a system, e.g., for logging. More generally, data classification can be used to drive redaction, encryption, data retention policy, data residency policy, and more.

Data classification implicates a taxonomy which defines at least one data classification. Sometimes a given company, institution, agency, or other entity utilizes more than one distinct classification taxonomy, e.g., an enterprise taxonomy, a consumer taxonomy, and a corporate taxonomy. In many cases, taxonomies are considered proprietary, and entity policy forbids their use outside of the entity. Some governments also issue public taxonomies. Different entities often use different taxonomies. At least one industry standard also defines aspects of at least one taxonomy; see, e.g., International Organization for Standardization document ISO 19944-1 First edition 2020-10 (a.k.a. ISO/IEC 19944-1:2020 (E)) (this ISO/IEC document is noted here merely as an example; the content of this ISO/IEC document is not part of the present disclosure).

Because taxonomies are often kept as confidential proprietary information within an entity, the variation among taxonomies has had limited impact. However, the innovators saw opportunities for beneficial use of taxonomy-agnostic frameworks, both inside a given entity and at the interfaces between entities. Within a given entity, a taxonomy-agnostic framework would help facilitate changes in taxonomies, such as simplifications, updates to match changed compliance requirements, and even a consolidation of two taxonomies into a single taxonomy. At the interfaces where classified data passes from one entity to another entity, a taxonomy-agnostic framework would help increase efficiency by reducing or removing a perceived need for the data-receiving entity to replicate or verify data classification computational work which was already done by the data-sending entity.

Some advantageous characteristics of a taxonomy-agnostic framework include the following characteristics, although any particular taxonomy-agnostic framework does not necessarily have all of these characteristics, and may also or instead have other characteristics.

One advantageous characteristic of a data classification model in a data protection framework of some embodiments is a focus on aspects that provide the ability for both static classification and dynamic classification of data 118. Static classification includes classification of data at rest, whereas dynamic classification includes classification of data in transit.

Another advantageous characteristic of a data classification model in some embodiments is support for data classification annotation of individual properties, fields, types, and return values, with a data classification attribute indicating a sensitivity of the annotated item's payload. For example, a property can be marked as [GDPRRES], where "[ ]" indicates annotation and "GDPRRES" represents data classification as GDPR restricted data; GDPR stands for General Data Protection Regulation.

Another advantageous characteristic of a data classification model in some embodiments is support for encapsulation of any piece of state 118 into a strongly typed data classification wrapper. For example, this may be indicated using a syntax such as GDPRRES<UserAddress>, which represents a computational semantic meaning that includes encapsulation of UserAddress data in a GDPR restricted data wrapper. Such an encapsulation provides strong typing, which helps prevent accidental intermingling of data in different data classifications. Such intermingling is an example of a flaw in data classification propagation.

Another advantageous characteristic of a data classification model in some embodiments is an ability to consume data classifications from program source code. A developer or an automated source code generator annotates data at relevant points in source code, e.g., where variables are defined, where data is ingested, or where data is transmitted. When the annotated source code is compiled, the executable program built from the annotated source code propagates data classifications accordingly. For example, when logging data, the program redacts data classified as GDPRRES to comply with GDPR rules. Different source codes may use different respective taxonomies. The effective meaning of a classification depends on a data classification processing routine that does not appear in the source code. In some embodiments, classifications are defined in application-level data structures; infrastructure processing these data structures recognizes the classification, but is agnostic to the specific taxonomy wherein the classification is defined. This allows the same code to be easily used for different taxonomies through changing the data structure. Redactors and other data classification processing routines are pluggable parts of the taxonomy framework, providing flexibility even when the taxonomy classifications are company-specific and company confidential.

Another advantageous characteristic of a data protection framework in some embodiments is the availability of static analysis which validates that annotated data is properly manipulated in a program source code. This helps to ensure data of a particular classification doesn't get misclassified. Such misclassification is an example of a flaw in data classification propagation. This analysis is helpful even when it is not necessarily complete and does not necessarily guarantee the absence of errors.

Another advantageous characteristic of a data protection framework in some embodiments is the availability of classification reports, such as a report for the various models in an application showing their full data classification. This helps facilitate compliance audits.

Another advantageous characteristic of a data protection framework in some embodiments is support for data redaction as a de-identification technique. A flexible redaction model supports redaction of data of different classifications, depending on at least the data classification of the data.

Another advantageous characteristic of a data protection framework in some embodiments is support for data redaction in conjunction with various kinds of telemetry operations such as logging, metering, and tracing. An advantageous logging infrastructure supports annotating parameters of a logging routine with a particular data classification and then the logging routine automatically performs redaction on the parameters, based on configuration. Some embodiments include a logging method with a parameter attributed as [PII], for example, and the logger does the corresponding redaction for whatever argument was passed as that parameter. Moreover, in some embodiments of a system wherein data is tagged as it flows through the system, the logging method also inspects the data itself, regardless of how the parameter is annotated. For example, suppose a call MyLog-Method(obj) is made, and obj is actually a PII<Data>. Then even though the obj parameter isn't attributed, this data is nonetheless treated by the logger as PII. As another example, assume an unannotated parameter of a type has properties annotated as [PII]. Then in some embodiments the logger handles those properties as PII.

Some embodiments access a taxonomy-agnostic data protection framework of a computing system. The taxonomy-agnostic data protection framework includes a data classification taxonomy definition, which includes a taxonomy identifier and a set of data classification indicators. Some embodiments perform a static analysis of a source code based on at least the data classification indicators. Static analysis results may be inconclusive. However, in some embodiments and some scenarios, at least one of the following determinations is made, based on at least a result of the static analysis: the source code correctly propagates a particular data classification, the source code does not correctly propagate a particular data classification, or the source code does not apply a particular data classification to particular data even though the particular data has a data type or a data format which is compatible with the particular data classification. This taxonomy-agnostic data protection framework and static analysis functionality provide the technical benefit of detecting and reporting flaws in data classification propagation. Such flaws can lead to inadvertent disclosure of sensitive data which should have been flagged for protection but was not, or to inefficiency when multiple programs repeat the same data classification work to reach the same data classification outcome.

One example of a data classification propagation flaw occurs when the source code does not apply a particular data classification to particular data even though the particular data has a data type or a data format which is compatible with the particular data classification. In one instance, static analysis finds a class member FirstName and a class member FamilyName in a class ContactInfo, but even though the taxonomy includes a PII ("personal identification information", also sometimes referred to as "personally identifiable information" or "personal identifiable information") classification indicator, neither the class ContactInfo nor its members are annotated as PII or as any other kind of classified data. In a variation, the class ContactInfo is incorrectly annotated as CompanyConfidential.

In another instance, static analysis finds a function get-Card ( ) which reads sixteen numeric digits from an input and returns them as a string, thus indicating the return value is likely a credit card number. But even though the taxonomy includes an AccountNumber classification indicator, the return value is not annotated as classified data. This is a data classification propagation flaw.

In another instance, static analysis finds a variable Customer passed into a procedure ReportOverdueAccounts, in which Customer was annotated as [GDPR] when declared, and Customer is bound to a parameter c of a data type customers which is annotated as [World]. Because the GDPR annotation based on Europe's General Data Protection Regulation denotes a narrower geographic area of permitted presence than the World annotation, static analysis reports the mismatch as a data classification propagation flaw.

Some embodiments annotate a data transport structure with a particular data classification indicator thereby producing an annotated data transport structure, and send data over a network connection, wherein the data conforms to the annotated data transport structure. This use of a data transport structure which is annotated per a taxonomy-agnostic data protection framework provides the technical benefit of increasing the efficiency of systems that transmit classified data between a sender and a receiver, e.g., between two services or between a client and a server. The data transport protocol followed by the sender and the receiver incorporates the annotated data structure, allowing the receiver to follow the same classified data handling rules as the sender without repeating the sender's computational work to determine a classification of the data.

Some embodiments receive data, annotate the data with a particular data classification indicator thereby producing annotated data, and forward the annotated data over a network connection. For instance, a telemetry collection device may receive telemetry data, classify any not-yet-classified telemetry data and annotate it accordingly, and then forward the classified and annotated data to a logging device. This data protection functionality provides the technical benefit of dynamic classification of data, which decreases the risk of inadvertent disclosure of sensitive data. Dynamic classification functionality also provides architectural flexibility by permitting the placement of classification computations on a larger set of devices than mere static classification permits.

Some embodiments include a data classification taxonomy definition which has a taxonomy identifier and a set of data classification indicators corresponding to bit positions in a bit vector. This bit vector taxonomy functionality provides the technical benefit of a very efficient transport of state classification within a program or between programs. For instance, some embodiments map data classifications to respective positions in a 32-bit vector, allowing up to thirty-one classifications (end user identification info, customer billing info, organization identification info, etc.) plus a default or catch-all classification, within a mere four bytes of data. Use of a bit vector also has the technical benefit of efficiently supporting combinations of classifications, e.g., an annotation may indicate that particular data is both PII (personal identification information) and PHI (personal health information) by setting the corresponding two bits in a bit vector that annotates the particular data.

However, some embodiments supplement or replace such bit vectors with other mechanisms, e.g., pointers to rich data structures which can carry more semantics. In some embodiments, a unique identifier represents each classification of data. The unique identifiers include unique integer values, enabling efficient OR logic, or another piece of state with a unique unambiguous value.

Some embodiments include a set of data classification processing routines, and a mapping mechanism which upon execution by a processor maps between data classification processing routines and data classification indicators. The mapping "between" routines and indicators may be from routines to indicators, from indicators to routines, or in both directions, depending on the embodiment. This mapping provides the technical benefit of making the redactors, encryptors, and other routines that process classified data into pluggable routines. Moreover, the mapping mechanism is supplemented in some embodiments by rules to resolve conflicts between classifications. For instance, when one classification on a piece of data is mapped to a delete-after-thirty-days routine and another classification on the same piece of data is mapped to a delete-after-sixty-days routine, the mapping mechanism resolves the conflict by invoking the most restrictive routine, namely, the delete-after-thirty-days routine.

These and other benefits will be apparent from the teachings provided herein.

Operating Environments

With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud 136. An individual machine is a computer system, and a network or other group of cooperating machines is also a computer system. A given computer system 102 may be configured for end-users, e.g., with applications, for administrators, as a server, as a distributed processing node, and/or in other ways.

Human users 104 sometimes interact with a computer system 102 user interface 330 by using displays 126, keyboards 106, and other peripherals 106, via typed text, touch, voice, movement, computer vision, gestures, and/or other forms of I/O. Virtual reality or augmented reality or both functionalities are provided by a system 102 in some embodiments. A screen 126 is a removable peripheral 106 in some embodiments and is an integral part of the system 102 in some embodiments. The user interface supports interaction between an embodiment and one or more human users. In some embodiments, the user interface includes one or more of: a command line interface, a graphical user interface (GUI), natural user interface (NUI), voice command interface, or other user interface (UI) presentations, presented as distinct options or integrated.

System administrators, network administrators, cloud administrators, security analysts and other security personnel, operations personnel, developers, testers, engineers, auditors, and end-users are each a particular type of human user 104. In some embodiments, automated agents, scripts, playback software, devices, and the like running or otherwise serving on behalf of one or more humans also have user accounts, e.g., service accounts. Sometimes a user account is created or otherwise provisioned as a human user account but in practice is used primarily or solely by one or more services; such an account is a de facto service account. Although a distinction could be made, "service account" and "machine-driven account" are used interchangeably herein with no limitation to any particular vendor.

Storage devices or networking devices or both are considered peripheral equipment in some embodiments and part of a system 102 in other embodiments, depending on their detachability from the processor 110. In some embodiments, other computer systems not shown in FIG. 1 interact in technological ways with the computer system 102 or with another system embodiment using one or more connections to a cloud 136 and/or other network 108 via network interface equipment, for example.

Each computer system 102 includes at least one processor 110. The computer system 102, like other suitable systems, also includes one or more computer-readable storage media 112, also referred to as computer-readable storage devices 112. In some embodiments, tools 122 include security tools or software applications, on mobile devices 102 or workstations 102 or servers 102, editors, compilers, debuggers and other software development tools, as well as APIs, browsers, or webpages and the corresponding software for protocols such as HTTPS, for example. Files, APIs, endpoints, and other resources may be accessed by an account or set of accounts, user 104 or group of users 104, IP address or group of IP addresses, or other entity. Access attempts may present passwords, digital certificates, tokens or other types of authentication credentials.

Storage media 112 occurs in different physical types. Some examples of storage media 112 are volatile memory, nonvolatile memory, fixed in place media, removable media, magnetic media, optical media, solid-state media, and other types of physical durable storage media (as opposed to merely a propagated signal or mere energy). In particular, in some embodiments a configured storage medium 114 such as a portable (i.e., external) hard drive, CD, DVD, memory stick, or other removable nonvolatile memory medium becomes functionally a technological part of the computer system when inserted or otherwise installed, making its content accessible for interaction with and use by processor 110. The removable configured storage medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory nor a computer-readable storage device is a signal per se or mere energy under any claim pending or granted in the United States.

The storage device 114 is configured with binary instructions 116 that are executable by a processor 110; "executable" is used in a broad sense herein to include machine code, interpretable code, bytecode, and/or code that runs on a virtual machine, for example. The storage medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as events manifested in the system 102 hardware, product characteristics, inventories, physical measurements, settings, images, readings, volumes, and so forth. Such data is also transformed by backup, restore, commits, aborts, reformatting, and/or other technical operations.

Although an embodiment is described as being implemented as software instructions executed by one or more processors in a computing device (e.g., general purpose computer, server, or cluster), such description is not meant to exhaust all possible embodiments. The same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, some embodiments include one of more of: hardware logic components 110, 128 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. In some embodiments, components are grouped into interacting functional modules based on their inputs, outputs, or their technical effects, for example.

In addition to processors 110 (e.g., CPUs, ALUs, FPUs, TPUs, GPUs, and/or quantum processors), memory/storage media 112, peripherals 106, and displays 126, some operating environments also include other hardware 128, such as batteries, buses, power supplies, wired and wireless network interface cards, for instance. The nouns "screen" and "display" are used interchangeably herein. In some embodiments, a display 126 includes one or more touch screens, screens responsive to input from a pen or tablet, or screens which operate solely for output. In some embodiments, peripherals 106 such as human user I/O devices (screen, keyboard, mouse, tablet, microphone, speaker, motion sensor, etc.) will be present in operable communication with one or more processors 110 and memory 112.

In some embodiments, the system includes multiple computers connected by a wired and/or wireless network 108. Networking interface equipment 128 can provide access to networks 108, using network components such as a packet-switched network interface card, a wireless transceiver, or a telephone network interface, for example, which are present in some computer systems. In some, virtualizations of networking interface equipment and other network components such as switches or routers or firewalls are also present, e.g., in a software-defined network or a sandboxed or other secure cloud computing environment. In some embodiments, one or more computers are partially or fully "air gapped" by reason of being disconnected or only intermittently connected to another networked device or remote cloud. In particular, taxonomy-agnostic data protection functionality 204 could be installed on an air gapped network and then be updated periodically or on occasion using removable media 114, or not updated at all. Some embodiments also communicate technical data or technical instructions or both through direct memory access, removable or non-removable volatile or nonvolatile storage media, or other information storage-retrieval and/or transmission approaches.

The foregoing aspects and other aspects presented herein under "Operating Environments" form part of some embodiments. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but interoperate with items in an operating environment or some embodiments as discussed herein. It does not follow that any items which are not in outline or parenthetical form are necessarily required, in any Figure or any embodiment. In particular, FIG. 1 is provided for convenience; inclusion of an item in FIG. 1 does not imply that the item, or the described use of the item, was known prior to the current disclosure.

In any later application that claims priority to the current application, reference numerals may be added to designate items disclosed in the current application. Such items may include, e.g., software, hardware, steps, processes, systems, functionalities, mechanisms, data structures, computational resources, programming languages, tools, workflows, or algorithm implementations, or other items in a computing environment, which are disclosed herein but not associated with a particular reference numeral herein. Corresponding drawings may also be added.

More About Systems

FIG. 2 illustrates a computing system 102 configured by one or more of the taxonomy-agnostic data protection enhancements taught herein, resulting in an enhanced system 202. This is not a comprehensive summary of all aspects of enhanced systems 202 or all aspects of taxonomy-agnostic data protection functionality 204, and some embodiments omit illustrated aspects. In some embodiments, this enhanced system 202 includes a single machine, a local network of machines, machines in a particular building, machines used by a particular entity, machines in a particular datacenter, machines in a particular cloud, or another computing environment 100 that is suitably enhanced. FIG. 2 items are discussed at various points herein, and additional details regarding them are provided in the discussion of a List of Reference Numerals later in this disclosure document.

FIG. 3 shows some aspects of some enhanced systems 202. This is not a comprehensive summary of all aspects of enhanced systems 202 or all aspects of taxonomy-agnostic data protection functionality 204, and some embodiments omit illustrated aspects. Nor is it a comprehensive summary of all aspects of an environment 100 or other context of an enhanced system 202, or a comprehensive summary of any aspect of functionality 204 for potential use in or with a system 102. FIG. 3 items are discussed at various points herein, and additional details regarding them are provided in the discussion of a List of Reference Numerals later in this disclosure document.

FIG. 4 shows some aspects of some data classification taxonomies 132. This is not a comprehensive summary of all aspects of taxonomies 132 or of data classification, and some embodiments omit illustrated aspects. FIG. 4 items are discussed at various points herein, and additional details regarding them are provided in the discussion of a List of Reference Numerals later in this disclosure document.

FIG. 5 is a data flow diagram illustrating some aspects of data classification propagation 902. This is not a comprehensive summary of all aspects of propagation 902 or of systems 102 that perform propagation 902, and some embodiments omit illustrated aspects. FIG. 5 items are discussed at various points herein, and additional details regarding them are provided in the discussion of a List of Reference Numerals later in this disclosure document.

FIG. 6 is a block diagram illustrating some architectural aspects of a taxonomy-agnostic data protection framework 212. This is not a comprehensive summary of all aspects of data protection frameworks 212, and some embodiments omit illustrated aspects. FIG. 6 items are discussed at various points herein, and additional details regarding them are provided in the discussion of a List of Reference Numerals later in this disclosure document.

Other figures are also relevant to systems 202. FIGS. 7, 8, and 9 illustrate methods of system 202 operation.

In some embodiments, the enhanced system 202 is networked through an interface 324. In some, an interface 324 includes hardware such as network interface cards, software such as network stacks, APIs, or sockets, combination items such as network connections, or a combination thereof.

Some embodiments include a computing system 202 which is configured to provide functionality 204. The computing system 202 includes: a digital memory 112; a processor set 110 including at least one processor 110, the processor set in operable communication with the digital memory; and a data classification taxonomy definition 134 which includes a taxonomy identifier 402 and a set of data classification indicators 304 corresponding to bit positions 406 in a bit vector 404. This computing system 202 also includes a set of data classification processing routines 216, and a mapping mechanism 218 which upon execution by the processor set maps 914 between data classification processing routines 216 and data classification indicators 304. Depending on the embodiment, the mapping 914 is one-to-one (each indicator corresponds to one routine), one-to-many (at least one indicator is configured to trigger invocation of multiple routines), or many-to-one (more than one indicator triggers invocation of the same routine), or many-to-many. In some but not all embodiments, at least one indicator 304, or at least one routine 216, is present in the system 202 but is not mapped 914.

In some embodiments, the correspondence between bit positions and data classification indicators is one-to-one. For instance, assume the taxonomy defines ten data classification indicators 304, denoted here for convenience as dci0 through dci9. Bit positions are denoted here for convenience as bit0 through bitn, where n is one less than the total number of bits in the vector, e.g., a 32-bit vector 404 has bit positions bit0 through bit31, which are also referred to as bits bit0 through bit31. In an example one-to-one correspondence, bit0 through bit9 represent dci0 through dci9, respectively, in that the indicator is present if and only if the corresponding bit is set, and bit10 through bit31 are not assigned.

However, in some embodiments the correspondence between bit positions and data classification indicators is more complex than a one-to-one correspondence. In an example in which indicators 304 are grouped, bit0 represents health information classifications, and bit10 represents financial information classifications. Classification of data as a medical service provider's patient identification number is represented by bit0 and bit1, classification of data as a patient's health insurance provider identification information is represented by bit0 and bit2, and classification of data as a patient's health condition information is represented by bit0 and bit3. Classification of data as a credit card account number is represented by bit10 and bit11, and classification of data as a bank account number is represented by bit10 and bit12.

As another example, in some embodiments when multiple bits are set in the vector 404, the top-most bit wins and the redactor or other routine 216 associated with that bit is invoked. The ability to provide rules 316 for combining multiple bits provides an alternative to configuring an explicit routine 216 for each possible $2 \wedge 64$ combination of bits (in a 64-bit vector). These are examples; other correspondences between vector 404 bits 406 and data classification indicators 304 are also present in some embodiments.

As another example, in some embodiments classifications 130 correspond to numeric ranges or bitfields in data classification indicators 304. For instance, a first range or bitfield is designated for geographical or jurisdictional classifications 130, e.g., EU, US, GDRP, etc., and a second distinct range or bitfields is designated for the kind-of-data, e.g., health, PII, company policy, etc.

Unless stated otherwise, each vector-based correspondence between vector bits 406 and data classification indicators 304 depends on one or more bit positions 406, as opposed to being defined as an integer number in a sequence of numeric values that happen to have digital representations as bits or being defined as a string that happens to have a digital representation as bits, for example. Basing the correspondence on bit positions permits bitwise logic operations, e.g., a vector representing two or more indicators is formed 314 by logically ORing the vectors of the individual indicators, and a vector representing every indicator except a particular indicator is formed 314 as the unary bitwise logical complement of the vector of the individual indicator.

Although a 32-bit vector example is discussed above, other vector sizes are used in some embodiments, e.g., 64-bit or 128-bit bit vectors, or a combination of vectors of different sizes. These vector sizes are examples, and embodiments are not inherently limited to these examples.

In some embodiments, for multiple of the data classification indicators the data classification taxonomy definition associates exactly one bit position in the bit vector with each respective data classification indicator of the multiple data classification indicators. This occurs, e.g., in a one-to-one correspondence in which bit0 through bit20 represent dci0 through dci20, respectively. This one-to-one correspondence does not necessarily involve every bit; it is present even when bit21 through bit31 are not in a one-to-one correspondence with respective classification indicators.

In some embodiments, the mapping mechanism 218 includes at least one of: a dictionary 418, a database 420, or a set of callbacks 422. The dictionary may be prepopulated, e.g., to recognize particular bit combinations in a bit vector.

In some embodiments, the mapping mechanism 218 includes a default processing routine 216 identification which identifies 914 a default processing routine 318, 216 which is invoked when no other processing routine is mapped 914 to a data classification indicator. For example, in some embodiments of a logging program 518, when the program receives 516 classified data 118 to be logged but no particular routine 216 corresponds to the classification indicator 304 that is associated with the particular classified data, the protection framework 212 which is embedded in (or called by) the logging program 518 invokes 802 a default routine 318. The default routine 318 effectively deletes 432 the particular classified data by not logging it on any non-volatile medium 112.

In some embodiments, the data classification processing routines 216 include a data classification processing routine 216 which upon execution by the processor set performs at least one of the following actions 912 on data that is annotated with an annotation 438, 304 that is mapped 914 to the data classification processing routine: deletion 432, redaction 428, encryption 430, anonymization 434, pseudonymization 436, hashing 424, or enrichment 426.

In some embodiments, encryption 430 stores data in a form that is difficult for unauthorized persons to read and understand.

In some embodiments, enrichment 426 adds to data. For instance, when data is tagged 438 as Type X in the taxonomy, enrichment 426 adds an additional attribute which represents a geographical location of a user to support enforcement that keeps the data within a geographic boundary, such as Europe.

In some embodiments, the set of data classification indicators 304 includes at least one of: source code 124 annotations 438, a sidecar file 416, an online database 420, or a compiler-based mapping 408.

Some embodiments include a rule 316 for combining 314 data classification indicators 304 to produce another data classification indicator 304. In some but not all scenarios, the combination 314 is part of a resolution 412 of a conflict 410 between classification indicators 304 or their mapped routines 216.

One example of such combining 314 includes combining an indicator dcix and an indicator dciy to produce an indicator dcixy, e.g., combining an indicator that data is classified as patient information with an indicator that data is classified as financial information, to produce an indicator that data is classified as patient financial information. Another example is combining 314 an indicator that data is classified as company confidential with an indicator that data is classified as patent information, to produce an indicator that data is classified as unpublished patent application information.

As another example, to determine whether two distinct pieces of data are in any of the same categories, some embodiments bitwise AND them together. As another example, some embodiments leverage bit ordering to provide additional semantics. In one scenario, bit 31 takes precedence over than bit13. To influence or determine a course of action to redact a piece of state, an embodiment looks for rules based on an exact match of the bit vector to configuration state. If no exact match is found and there are multiple bits set in the vector, the embodiment iterates through all the bits from highest priority to lowest priority looking for the individual bits. If no single-bit match is found, then the embodiment falls back to a default behavior 318. A technical benefit is that such bit prioritization can dramatically reduce the amount of configuration state employed to cover possible bit combinations.

Other system embodiments are also described herein, either directly or derivable as system versions of described processes or configured media, duly informed by the extensive discussion herein of computing hardware.

Although specific taxonomy-agnostic data protection architecture examples are shown in the Figures, an embodiment may depart from those examples. For instance, items shown in different Figures may be included together in an embodiment, items shown in a Figure may be omitted, functionality shown in different items may be combined into fewer items or into a single item, items may be renamed, or items may be connected differently to one another.

Examples are provided in this disclosure to help illustrate aspects of the technology, but the examples given within this document do not describe all of the possible embodiments. A given embodiment may include additional or different kinds of data protection functionality, for example, as well as different technical features, aspects, mechanisms, software, data classifications, data classification indicator implementations, data processing routines, operational sequences, commands, data structures, programming environments, resources, programming languages or pseudocode, execution environments, environment or system characteristics, or other functionality consistent with teachings provided herein, and may otherwise depart from the particular examples provided.

Processes (a.k.a. Methods)

Processes (which are also be referred to as "methods" in the legal sense of that word) are illustrated in various ways herein, both in text and in drawing figures. FIGS. 7, 8, and 9 each illustrate a family of methods 700, 800, and 900 respectively, which are performed or assisted by some enhanced systems, such as some systems 202 or another taxonomy-agnostic data protection functionality enhanced system as taught herein. Method family 700 and method family 800 are each a proper subset of method family 900.

FIGS. 1 to 6 illustrate system 202 architectures with implicit or explicit data protection actions, e.g., checking access permissions, monitoring activity and checking for unusual activity, installing or modifying data protection policies, installing or modifying a framework 212, or otherwise processing data 118, alerting, and archiving, in which the data 118 includes, e.g., sensitive data 508, data classification indicators 304, source code 124, hashes, routines 216, and taxonomy names 402, among other examples disclosed herein.

Technical processes shown in the Figures or otherwise disclosed will be performed automatically, e.g., by an enhanced system 202, unless otherwise indicated. Related non-claimed processes may also be performed in part automatically and in part manually to the extent action by a human person is implicated, e.g., in some situations a human 104 types a key into a user interface 324 to accept an automatically generated suggestion 312. But no process contemplated as innovative herein is entirely manual or purely mental; none of the claimed processes can be performed solely in a human mind or on paper. Any claim interpretation to the contrary is squarely at odds with the present disclosure.

In a given embodiment zero or more illustrated steps of a process may be repeated, perhaps with different parameters or data to operate on. Steps in an embodiment may also be done in a different order than the top-to-bottom order that is laid out in FIG. 9. FIG. 9 is a supplement to the textual examples of embodiments provided herein and the textual descriptions of embodiments provided herein. In the event of any alleged inconsistency, lack of clarity, or excessive breadth due to an aspect or interpretation of FIG. 9, the text of this disclosure shall prevail over that aspect or interpretation of FIG. 9.

Arrows in process or data flow figures indicate allowable flows; arrows pointing in more than one direction thus indicate that flow may proceed in more than one direction. Steps may be performed serially, in a partially overlapping manner, or fully in parallel within a given flow. In particular, the order in which flowchart 900 action items are traversed to indicate the steps performed during a process may vary from one performance of the process to another performance of the process. The flowchart traversal order may also vary from one process embodiment to another process embodiment. Steps may also be omitted, combined, renamed, regrouped, be performed on one or more machines, or otherwise depart from the illustrated flow, provided that the process performed is operable and conforms to at least one claim of an application or patent that includes or claims priority to the present disclosure. To the extent that a given sequence S of steps which is consistent with FIG. 9 is non-operable, the sequence S is not within the scope of any claim. Any assertion otherwise is contrary to the present disclosure.

Some embodiments provide or utilize a data protection method 900 performed by a computing system 202. In this discussion and generally elsewhere herein, "method" is used in the legal sense rather than the computer science sense. In some embodiments, the method includes accessing 702 a taxonomy-agnostic data protection framework 212 of the computing system, the taxonomy-agnostic data protection framework 212 including a data classification taxonomy definition 134, the data classification taxonomy definition including a taxonomy identifier 402 and a set of data classification indicators 304; performing 704 a static analysis 214 of a source code 124 based on at least the data classification indicators; and reporting 706 at least one of the following determinations 708 based on at least a result of the static analysis: the source code correctly propagates 902 a particular data classification 130, the source code does not correctly propagate 902 a particular data classification 130, or the source code does not apply 916 a particular data classification to particular data even though the particular data has a data type 522 or a data format 524 which is compatible with the particular data classification.

Some embodiments include annotating 520 a data transport structure 510 with a particular data classification indicator 304 thereby producing an annotated data transport structure 510, and sending 514 data 508 over a network connection, wherein the data conforms 526 to the annotated data transport structure. Two example scenarios which benefit from transport of data classification information are: sending data to a telemetry system, and sending data between services.

Some embodiments adapt network communication protocol buffers to accomplish this transport of data classification information. In particular, in some embodiments a language-neutral platform-neutral extensible mechanism for serializing data is adapted in view of the teachings herein to facilitate network transport of data classification information.

In some embodiments, there are two distinct phases in an interaction between a client and a server, or between two other networked communication points. A first phase obtains or creates a definition of a protocol between the two communication points; the definition includes annotated data transport structures. Annotating these data transport structures permits both communication points to follow the same rules on how to process the data. A second phase includes an exchange of information between the communication points using the agreed-upon data transport structures to encode the data. The annotated data transport structure itself isn't sent over the network connection, but data complying with 526 the annotated data transport structure is sent. In effect, the annotated data transport structure represents a data schema, and data sent over the network connection is expected to correspond to this data schema.

Some embodiments include receiving 516 data 118, annotating 438 the data with a particular data classification indicator 304 thereby producing annotated data, and forwarding 514 the annotated data over a network connection. In some embodiments, data classification is used to drive automatic encryption of data in transit or at rest. In some scenarios for annotating data in transit, the data classification annotation 438 is chosen based on geographical or jurisdictional information, e.g., to indicate that this data is subject to GDPR or this data is restricted to Europe.

Some embodiments include acquiring 904 an automatically generated data annotation suggestion 908 to annotate a part of the source code 124 with a particular data classification indicator 304, and presenting 906 the automatically generated data annotation suggestion in a user interface 324. For example, a machine learning module or other artificial intelligence mechanism may be trained or otherwise adapted to generate suggestions 908 based on a specified set of data classifications 130. In some embodiments, inputs such as the name of a variable or a class or other data 118 container, the programming language data type 522 of a variable, the syntactic format 524 of a variable as expressed in a lexical analysis token or a regular expression, a classification propagation result, or user feedback from prior suggestions 908, or a combination thereof, serves as input to a machine learning model, a language model, or another artificial intelligence mechanism, which then generates one or more suggestions 908.

Some embodiments include receiving 516 sensitive data which is annotated with a particular data classification indicator 304, using 914 a mapping mechanism 218 to identify 914 a particular data classification processing routine 216 based on at least the particular data classification indicator, and invoking 802 the particular data classification processing routine on the sensitive data.

In some scenarios, selection of a data classification processing routine to invoke is based solely on the data classification indicator 304. However, in other scenarios, selection 802 of a data classification processing routine to invoke 802 is also based on other inputs to the mapping mechanism 218. For example, a physical location (e.g., country or political region) of a server 102 handling the data sometimes influences which routine 216 is selected 802. In some cases, a current date influences which routine 216 is selected, e.g., assume new regulations are coming into effect on a specific date, so the framework 212 is proactively configured to do one thing until that date and then do another thing after that date. For convenience, selection and invocation are each referred to here by reference numeral 802, on the assumption selection of a routine to be invoked is normally followed by invocation of that routine.

Some embodiments include mapping 914 a data classification annotation 438 on sensitive data 508 to multiple data classifications 130 in the data classification taxonomy definition 135. For example, an annotation may recite [GDPRRES, FIN] to indicate that data is classified both as GDPR restricted data and as Financial Data.

Some embodiments include auditing 320 and reporting 706 which data classification processing routines 216 were invoked for a specified set of data 118. In some embodiments, auditing 320 also, or instead, includes reporting 706 static analysis 214 results to show how the data is classified in the source code 124 and how the classification is propagated 902 (or not) in the source code. In some scenarios, the auditing 320 also reports 706 which data classification processing routines were actually invoked 802, in comparison with which routines 216 were invokable according to the static analysis.

In some embodiments, a conflict resolution is done at the level of the classifications. If data is classified as A and also classified as B, the embodiment determines whether B or A should take precedence. If B takes precedence, then the actions associated with B will be executed. Data items are classified to describe, e.g., the privacy state of the data. Separately, processing routines are executed for data based on the data's classification. In some embodiments, rules determine how to handle a given data item that bears multiple annotations, e.g., rules for prioritization or ordering of particular classifications over each other, to produce a determinative data classification for the data. Then the processing routine(s) are performed based on the mapping of classifications to processing routines.

Configured Storage Media

Some embodiments include a configured computer-readable storage medium 112. Some examples of storage medium 112 include disks (magnetic, optical, or otherwise), RAM, EEPROMS or other ROMs, and other configurable memory, including in particular computer-readable storage media (which are not mere propagated signals). In some embodiments, the storage medium which is configured is in particular a removable storage medium 114 such as a CD, DVD, or flash memory. A general-purpose memory, which is be removable or not, and is volatile or not, depending on the embodiment, can be configured in the embodiment using items such as taxonomy definitions 134, processing routines 216, mapping mechanisms 218, transport structures 308, generated suggestions 312, combination rules 316, static analysis tools 220, a framework 212 front-end 602, a framework 212 back-end 604, and source code annotations 438, in the form of data 118 and instructions 116, read from a removable storage medium 114 and/or another source such as a network connection, to form a configured storage medium. The configured storage medium 112 is capable of causing a computer system 202 to perform technical process steps for providing or utilizing taxonomy-agnostic data protection functionality 204, as disclosed herein. The Figures thus help illustrate configured storage media embodiments and process (a.k.a. method) embodiments, as well as system and process embodiments. In particular, any of the method steps illustrated in FIG. 7, 8, or 9, or otherwise taught herein, may be used to help configure a storage medium to form a configured storage medium embodiment. Storage devices are examples of storage media.

Some embodiments use or provide a computer-readable storage device 112, 114 configured with data 118 and instructions 116 which upon execution by a processor 110 cause a computing system 202 to perform a data protection method 900. This method includes: accessing 702 a taxonomy-agnostic data protection framework 212 of the computing system, the taxonomy-agnostic data protection framework including a data classification taxonomy definition 134, the data classification taxonomy definition including a taxonomy identifier 402 and a set of data classification indicators 304; and annotating 710 a source code 124 based on at least one of the data classification indicators.

In some embodiments, the taxonomy-agnostic data protection framework further includes a set of data classification processing routines 216 and a mapping mechanism 218 which maps 914 between data classification processing routines and data classification indicators, and the method further includes the computing system invoking 802 a particular data classification processing routine on particular data based at least in part on a particular data classification indicator 304 which is associated with the particular data.

In some embodiments, the method further includes the invoked data classification processing routine 216 performing 910 at least one of the following actions 912 on the particular data: deletion 432, redaction 428, anonymization 434, pseudonymization 436, or hashing 424.

In some embodiments, the method further includes the invoked data classification processing routine performing 910 at least one of the following actions 912 on the particular data: encryption 430, or enrichment 426.

In some embodiments, the method further includes the computing system auditing 320 multiple invocations 802 of data classification processing routines, and reporting 706 a result of the auditing. After data is annotated, some embodiments produce reports detailing these annotations in a form that can be (a) used by human auditors who are trying to assess the software's privacy compliance, or (b) ingested by tools that perform static analysis or dynamic analysis to assess whether the system is operating as expected. For example, an automated system may examine logs to verify whether data that should be redacted in fact has been redacted. Some embodiments produce audit reports suitable for both (a) and (b).

Additional Observations

Additional support for the discussion of taxonomy-agnostic data protection functionality 204 herein is provided under various headings. However, it is all intended to be understood as an integrated and integral part of the present disclosure's discussion of the contemplated embodiments.

One of skill in the art will recognize that not every part of this disclosure, or any particular details therein, are necessarily required to satisfy legal criteria such as enablement, written description, best mode, novelty, nonobviousness, inventive step, or industrial applicability. Any apparent conflict with any other patent disclosure, even from the owner of the present advances, has no role in interpreting the claims presented in this patent disclosure. With this understanding, which pertains to all parts of the present disclosure, examples and observations are offered herein.

Data can have various levels of sensitivity and may have different policies that should be applied in different circumstances. For example, a person's name may be highly sensitive and different polices should be applied depending on what is about to happen to data that includes the name (e.g., a policy could indicate what to do if a name is about to be transmitted outside of the organization).

Some embodiments provide a mechanism by which data can be annotated once and then tools that process the data can process it based on various requirements. The data is tagged (a.k.a. annotated), statically or dynamically, using various categories (a.k.a. data classifications). Some examples of categories 130 are Personally Identifying Information, Organizational Identifying information, and so forth. Some embodiments allow additional categories to be added.

Via some embodiments, a developer can tag types and type members in an object model, so that as the data passes through tools 518 within a pipeline (e.g., logging, reporting, transmitting, etc.), each tool can recognize the sensitivity level of the data. A policy (e.g., set of rules) specifies transforms 912 to happen to the data as it passes through a tool in the pipeline. For example, when transmitting data that has been annotated, a policy may indicate do nothing, hash 424, erase 432, encrypt 430, overwrite 428 with stars, etc. A policy can be associated with an organization, legal requirements, a geography, or other context. Multiple policies can be processed 910 for each piece of data. The policy can be varied based on destination of the data, e.g., logging, display to a user, automated alerts, various types of aggregated telemetry, storing the data into a database, transmitting it outside of the organization or certain boundaries. Policies are implemented using taxonomies 132 with actions 912 that that can be applied by transforming components. For example, one taxonomy may deal with GDPR, another taxonomy with a California protection act, etc. A company may have one or more taxonomies that indicate how to handle data.

Some embodiments include a taxonomy with data classifications, mechanisms by which taxonomies and classifications are defined, software providing an ability to define independent taxonomies which coexist within a single system, mechanisms by which a system annotates program state with data classifications, and computational work is enabled as a result of having the annotated state. Some embodiments include a taxonomy-neutral redaction architecture driven by annotated program state. Some embodiments include or utilize a taxonomy-neutral static analysis tool to promote data compliance patterns driven by annotated program state. Some embodiments utilize taxonomy-neutral report generation to facilitate auditing of privacy-sensitive program state.

In some embodiments, a taxonomy 132 includes a name 402 along with a set of possible classifications 130 relative to this name. Separately, there are mechanisms 304 which make it possible to associate a specific classification to a piece of state. One such mechanism is source code annotation 438, known in the C#programming language as attributes, so the annotations reside in the source along with the items being annotated, e.g. '[GDPRRES] public string Name;'.

Some embodiments correspond data classification indicators 304 with data classifications 130 using a different mechanism. In some, an interface description language (IDL) or other sidecar file 416 declares classifications 130 of individual data types 522 and type members. The data classification indicators 304 correspond 528 to data classifications 130, e.g. 'public string Name;' appears in a .cs file in C#source code and a separate.csv file contains 'Name, GDPRRES'. Some embodiments supply this correspondence 528 through an online database 420, and some hardcode the correspondence 528, 408 into a compiler. In each of these scenarios, there is a set of classifications 130 and a separate mechanism to couple these classifications 130 to data types 522 within an application 504.

With regard to pluggable data classification taxonomies and redaction, many organizations are trying to ensure that they are compliant with regulations for managing each user's personal data and privacy. Many organizations attempt to develop their own solution, including a data classification taxonomy to identify what data elements contain personal data, and attempt to include redaction of this data in their telemetry pipeline. Frequently, this solution is a single purpose implementation for a specific application that is not easily reused.

Some embodiments help standardize and simplify such efforts, by providing a general-purpose data classification taxonomy framework 212. Organizations can define their own data classification taxonomy, including defining any expected redactions, independent of their code that generates the data to be redacted. In some scenarios, developers annotate their telemetry calls using their taxonomy either statically or dynamically. In some scenarios, embodiments use the annotations to generate appropriate telemetry calls that invoke the correct redactors before the data is submitted to the telemetry collections service. This helps ensure that no private information leaves the server and thus reduces the risk of a privacy incident. Some embodiments generate compliance reports based on the data classification taxonomy. These reports document all data that has been annotated with the data classification taxonomy, where in the code that data is accessed, and how it was processed, for example. This functionality simplifies auditing code for compliance and further helps reduce risk of privacy incidents.

Some embodiments define classifications 130 and then interpret classification indicators 304 to guide redactors 216 which instantiate behaviors the classifications dictate. In some embodiments, classifications 130 are dynamically created by a third party for a system controlled by a different entity. In some embodiments, an infrastructure 212 allows a user to direct creation of an open-ended set of annotations 438, and to define via the framework 212 how to consume the annotations 438 in a back-end system. In some embodiments, the classifications 130 are not restricted to rigid set of classes of data in the programming language sense of "class". In some embodiments, the framework has an API, hooks, or other mechanism for plugging in routines 216 as user-supplied call back routines, which are invoked based on taxonomy name and bit vector value.

In some embodiments, state (data) passed through to a receiving program 518 from a sending program 504 includes a bit vector 404, 304 plus a taxonomy name string 402; in some of these, each bit 406 corresponds to a data classification 130. Then the receiving program 518 invokes processing routines 216 based on the taxonomy name and bit vector value(s).

In some embodiments, a mapping mechanism 218, auditing tool 322, data transport structure 308, default routine 318, or other mechanism combines classifications 130, e.g., by ORing bits 406, by ANDing bits 406, or by other operations. For example, a combination may indicate that classified data is both customer data and private data. Some embodiments define different behaviors by routines 216, for classification combinations. In some scenarios, any individual piece of state can belong to multiple data classifications, e.g., to indicate that data cannot leave Europe, is customer content, and is PII.

Upon receiving the bit vector 404 or another indicator 304, some embodiments perform auditing 320 which produces reports 706 summarizing or detailing which data structures have been annotated, which annotations have been acquired, or both. An auditor may utilize such reports as evidence that data is being treated correctly.

Upon receiving the bit vector 404 or another indicator 304, some embodiments send annotated data or conformant data to or through a telemetry system, while applying actions 912 per the indicator 304. Examples of actions 912 include null op (no action), erase 432, and hash 424 to allow correlation of data to a user for debugging without disclosing user identity. In some embodiments, if the bit vector is unrecognized for particular classified data, the embodiment falls back to a default redactor 318, e.g., one that erases the classified data.

Upon receiving the bit vector 404 or another indicator 304, some embodiments perform static analysis 214 of code 124 to ensure that annotations are propagated 902 correctly. For example, classification of data as customer data propagates to wherever that data is used in the code. If a particular variable or other data container or data type had a classification X and one point and then an attempt is made to assign the data of the data container or data type to a variable or data structure that is not annotated consistently with classification X, the assignment is flagged as an error. In some embodiments, any attempted change in classification is flagged, while in other embodiments changing from a classification X to a more restrictive classification Y is permitted.

Some embodiments dynamically tag data in a pipeline. This may include combining data and indicators, e.g., a firstname data classified as PII and a lastname data classified as PII are combined to form a fullname data classified as PII. The indicators combination is accomplished by bitwise OR dynamically. As another example, data headed for a border device may be dynamically classified to prevent it from being sent beyond the border. Some embodiments utilize reflection and apply indicators transitively. Although dynamic annotation sometimes degrades or prevents opportunities for static analysis, some embodiments do runtime validation, e.g., comparing data types 522 and indicators 304 found dynamically to a set of expected data types for indicators.

In some embodiments, an artificial intelligence module ascertains the presence in source code of a construct that is highly correlated with a particular classification indicator. For instance, the AI module detects a field called "name" on a class called "person". In response, the AI module determines that a name data type correlates to a PII attribute, and determines that a person data type also correlates to the PII attribute, so the AI module suggests that the developer consider adding the PII attribute as a privacy annotation.

In some embodiments, a DataClassification type represents a single data class. It is a small data structure that holds the name of a taxonomy, and a 64-bit bitmask representing the specific classification within the taxonomy. A DataClassification. None value is used for data which is explicitly unclassified, while DataClassification. Unknown is used for data whose classification is explicitly unknown. The specific behavior of Unknown is taxonomy dependent.

In some embodiments, data classifications belonging to the same taxonomy can be combined. Combining two classifications together often results in the strictest rules to apply to the affected state, but this is dependent on the taxonomy's rules. From a practical matter, combining two classes together results in a new DataClassification instance which ORs together the classifications of the two input objects. In some embodiments, trying to combine data classes from different taxonomies is invalid and leads to program failure.

In some embodiments, static data classification is done using .NET attributes applied to fields, properties, types, parameters, and method returns. A base attribute is DataClassificationAttribute which is an abstract class. Individual taxonomies extend this attribute with one attribute per data classification within the taxonomy.

In some scenarios, static classification of a data model is not done. Sometimes, classification is a dynamic property of a data model. For this use case, some embodiments utilize an IClassifiedData interface which returns a DataClassification instance representing the object's data classification.

Some embodiments utilize or include a static analyzer 220 designed to enforce specific rules around the use of data classification annotations. The analyzer helps ensure that classified data doesn't escape its data classification. In other words, it checks that pieces of state aren't assigned to storage locations that lose the data classification annotations. The static analysis is sometimes incomplete. In some embodiments, annotations are not a full robust type system, but are merely annotations on existing symbols. Accordingly, the static analyzer will not detect every flaw.

Different taxonomies sometimes have different rules in terms of data classification promotion and combination. The static analyzer does not necessarily support these rules. In some scenarios, the static analyzer categorically flags as violations any instance in which classified data is assigned to storage with a different classification. A particular taxonomy implementation sometimes provides explicit methods to escape this static analysis by capturing the valid conversion rules between data classifications.

Redaction, sometimes referred to as scrubbing, includes removing or obfuscating sensitive data to comply with data privacy rules. Redaction is a consideration for telemetry harvesting, to prevent sensitive data from being published into telemetry back-end systems.

Simply removing sensitive state is often undesirable as it renders telemetry data considerably less useful, e.g., less actionable. Instead, data is sometimes obfuscated by consistent one-way hashing. This hashing hides the data and complies with privacy rules, while enabling correlation of actions over time. In other words, examination of logs does not reveal who a user is, but will show that a given particular same user has been doing operations X, Y, and Z over time.

Different data classifications sometimes drive different types of redaction. For some data classifications, data is elided completely, in other cases a one-way hash is sufficient, and still in other cases cryptographic hashing with specific keys is sufficient. A redaction model 212 makes it possible to register an arbitrary number of redactor types in the system and associate them with specific data classifications. A component can get a redactor provider instance, query a provider for a data-class-specific redactor, and then redact the data.

As to telemetry integration, in some embodiments a logging code generator is aware of data classification and redaction. Applications can use data classification attributes on individual logging parameters, or on fields and properties of complex objects, and the logging code generator will arrange to apply the classification-specific redactor on each piece of state before it is submitted to the logging infrastructure.

Some alternate approaches to defining classifications utilize XML or JSON or a text list to be parsed. These approaches are not as efficient as other approaches described herein, such as bit vector approaches and in-the-source-code annotation approaches.

In some embodiments, the system 202 is an embedded system such as an Internet of Things system. "IoT" or "Internet of Things" means any networked collection of addressable embedded computing or data generation or actuator nodes. An individual node is referred to as an internet of things device 101 or IoT device 101 or internet of things system 102 or IoT system 102. Such nodes are examples of computer systems 102 as defined herein, and may include or be referred to as a "smart" device, "endpoint", "chip", "label", or "tag", for example, and IoT may be referred to as a "cyber-physical system". In the phrase "embedded system" the embedding referred to is the embedding a processor and memory in a device, not the embedding of debug script in source code.

IoT nodes and systems typically have at least two of the following characteristics: (a) no local human-readable display; (b) no local keyboard; (c) a primary source of input is sensors that track sources of non-linguistic data to be uploaded from the IoT device; (d) no local rotational disk storage-RAM chips or ROM chips provide the only local memory; (e) no CD or DVD drive; (f) being embedded in a household appliance or household fixture; (g) being embedded in an implanted or wearable medical device; (h) being embedded in a vehicle; (i) being embedded in a process automation control system; or (j) a design focused on one of the following: environmental monitoring, civic infrastructure monitoring, agriculture, industrial equipment monitoring, energy usage monitoring, human or animal health or fitness monitoring, physical security, physical transportation system monitoring, object tracking, inventory control, supply chain control, fleet management, or manufacturing. IoT communications may use protocols such as TCP/IP, Constrained Application Protocol (CoAP), Message Queuing Telemetry Transport (MQTT), Advanced Message Queuing Protocol (AMQP), HTTP, HTTPS, Transport Layer Security (TLS), UDP, or Simple Object Access Protocol (SOAP), for example, for wired or wireless (cellular or otherwise) communication. IoT storage or actuators or data output or control may be a target of unauthorized access, either via a cloud, via another network, or via direct local access attempts.

Technical Character

The technical character of embodiments described herein will be apparent to one of ordinary skill in the art, and will also be apparent in several ways to a wide range of attentive readers. Some embodiments address technical activities such as performing 704 static analysis 214 of source code 124, propagating 902 data classifications 130, invoking 802 data processing routines 216, automatically generating 310 data classification suggestions 312, annotating 520 data transport structures 510, sending 514 data over a network 108, and receiving 516 data over a network 108, which are each an activity deeply rooted in computing technology. Some of the technical mechanisms discussed include, e.g., static analysis tools 220, data classification indicators 304, processing routines 216, mapping mechanisms 218, taxonomy definitions 134, taxonomy-agnostic data protection frameworks 212, and sidecar files 416. Some of the technical effects discussed include, e.g., detection of flaws in data classification propagation 902, a data receiver 518 following the same classified data handling rules as a data sender 504 without the data receiver first repeating the sender's computational work to determine a classification 130 of the received data 508, dynamic classification of data which decreases the risk of inadvertent disclosure of sensitive data 508, and efficient support for combinations of classifications 130. Thus, purely mental processes and activities limited to pen-and-paper are clearly excluded. Other advantages based on the technical characteristics of the teachings will also be apparent from the description provided.

One of skill in the art understands that static analysis 214 is a technical activity which cannot be performed mentally because it requires traversal and modification of computing system memory 112. Merely thinking about operations to manipulate data 118 in a memory 112 will not accomplish those operations. Thoughts alone, or pen-and-paper manipulations, will not accomplish timely and correct analysis of data classification propagation 902. As disclosed herein, framework 212 back-end 604 activities involve invoking 802 a routine 216 in a computing system memory 112 (not on paper), which cannot be performed mentally or manually.

One of skill in the art also understands that attempting to perform data classification propagation 902 analysis 214 or protection actions 912 such as hashing 424, encryption 430, or redaction 428 even in part manually or mentally would create unacceptable delays in data classification-based processing, and would introduce a substantial risk of human errors that cause unwanted deletion of some data and unwanted disclosure of other data that should have been (or was) classified as sensitive data 508. At some point annotation 438, analysis 214, and processing actions 912 must be performed by a processor in a computer memory. People manifestly lack the speed, accuracy, memory capacity, and specific processing capabilities that are required to perform data protection 900 as taught herein.

Static analysis 214, data classification processing routines 216, and other computations and mechanisms described herein are parts of computing technology. Hence, the data protection 210 improvements described herein, such as framework 212 and other functionality 204, are improvements to computing technology.

Different embodiments provide different technical benefits or other advantages in different circumstances, and particular technical advantages follow from particular features or feature combinations, as noted at various points herein. Any generic or abstract aspects are integrated into a practical application such as an enhanced static analysis tool 220, enhanced source code editor which suggests annotations 438, enhanced telemetry pipeline, and enhanced programs 504, 518 which process classified data.

Some embodiments described herein may be viewed by some people in a broader context. For instance, concepts such as efficiency, reliability, user satisfaction, or waste may be deemed relevant to a particular embodiment. However, it does not follow from the availability of a broad context that exclusive rights are being sought herein for abstract ideas; they are not.

Rather, the present disclosure is focused on providing appropriately specific embodiments whose technical effects fully or partially solve particular technical problems, such as how to help ensure consistent use of data classifications within software, how to efficiently implement data classification indicators, how to make data classification redactors pluggable, and how to recognize and resolve to data classification conflicts. Other configured storage media, systems, and processes involving efficiency, reliability, user satisfaction, or waste are outside the present scope. Accordingly, vagueness, mere abstractness, lack of technical character, and accompanying proof problems are also avoided under a proper understanding of the present disclosure.

Additional Combinations and Variations

Any of these combinations of software code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the configured storage medium combinations and variants described above.

More generally, one of skill in the art will recognize that not every part of this disclosure, or any particular details therein, are necessarily required to satisfy legal criteria such as enablement, written description, or best mode. Also, embodiments are not limited to the particular scenarios, motivating examples, operating environments, tools, peripherals, software process flows, identifiers, data structures, data classifications, programming languages, naming conventions, notations, control flows, or other implementation choices described herein. Any apparent conflict with any other patent disclosure, even from the owner of the present innovations, has no role in interpreting the claims presented in this patent disclosure.

Acronyms, Abbreviations, Names, and Symbols

Some acronyms, abbreviations, names, and symbols are defined below. Others terms are defined elsewhere herein, or do not require definition here in order to be understood by one of skill in the art.

ALU: arithmetic and logic unit
API: application program interface
BIOS: basic input/output system
CD: compact disc
CPU: central processing unit
DVD: digital versatile disk or digital video disc
FPGA: field-programmable gate array
FPU: floating point processing unit
GDPR: General Data Protection Regulation
GPU: graphical processing unit
GUI: graphical user interface
HTTPS: hypertext transfer protocol, secure
IaaS or IAAS: infrastructure-as-a-service
LAN: local area network
OS: operating system
PaaS or PAAS: platform-as-a-service
RAM: random access memory
ROM: read only memory
TPU: tensor processing unit
UEFI: Unified Extensible Firmware Interface
UI: user interface
WAN: wide area network Some Additional Terminology Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The present disclosure asserts and exercises the right to specific and chosen lexicography. Quoted terms are being defined explicitly, but a term may also be defined implicitly without using quotation marks. Terms may be defined, either explicitly or implicitly, here in the Detailed Description and/or elsewhere in the application file.

A "computer system" (a.k.a. "computing system") may include, for example, one or more servers, motherboards, processing nodes, laptops, tablets, personal computers (portable or not), personal digital assistants, smartphones, smartwatches, smart bands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry.

A "multithreaded" computer system is a computer system which supports multiple execution threads. The term "thread" should be understood to include code capable of or subject to scheduling, and possibly to synchronization. A thread may also be known outside this disclosure by another name, such as "task," "process," or "coroutine," for example. However, a distinction is made herein between threads and processes, in that a thread defines an execution path inside a process. Also, threads of a process share a given address space, whereas different processes have different respective address spaces. The threads of a process may run in parallel, in sequence, or in a combination of parallel execution and sequential execution (e.g., time-sliced).

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, machine learning, and so on.

"Kernels" include operating systems, hypervisors, virtual machines, BIOS or UEFI code, and similar hardware interface software.

"Code" means processor instructions, data (which includes constants, variables, and data structures), or both instructions and data. "Code" and "software" are used interchangeably herein. Executable code, interpreted code, and firmware are some examples of code.

"Program" is used broadly herein, to include applications, kernels, drivers, interrupt handlers, firmware, state machines, libraries, and other code written by programmers (who are also referred to as developers) and/or automatically generated.

A "routine" is a callable piece of code which normally returns control to an instruction just after the point in a program execution at which the routine was called. Depending on the terminology used, a distinction is sometimes made elsewhere between a "function" and a "procedure": a function normally returns a value, while a procedure does not. As used herein, "routine" includes both functions and procedures. A routine may have code that returns a value (e.g., sin (x)) or it may simply return without also providing a value (e.g., void functions).

"Service" means a consumable program offering, in a cloud computing environment or other network or computing system environment, which provides resources to multiple programs or provides resource access to multiple programs, or does both. A service implementation may itself include multiple applications or other programs.

"Cloud" means pooled resources for computing, storage, and networking which are elastically available for measured on-demand service. A cloud 136 may be private, public, community, or a hybrid, and cloud services may be offered in the form of infrastructure as a service (IaaS), platform as a service (PaaS), software as a service (Saas), or another service. Unless stated otherwise, any discussion of reading from a file or writing to a file includes reading/writing a local file or reading/writing over a network, which may be a cloud network or other network, or doing both (local and networked read/write). A cloud may also be referred to as a "cloud environment" or a "cloud computing environment".

"Access" to a computational resource includes use of a permission or other capability to read, modify, write, execute, move, delete, create, or otherwise utilize the resource. Attempted access may be explicitly distinguished from actual access, but "access" without the "attempted" qualifier includes both attempted access and access actually performed or provided.

Herein, activity by a user refers to activity by a user device or activity by a user account, or by software on behalf of a user, or by hardware on behalf of a user. Activity is represented by digital data or machine operations or both in a computing system. Activity within the scope of any claim based on the present disclosure excludes human actions per se. Software or hardware activity "on behalf of a user" accordingly refers to software or hardware activity on behalf of a user device or on behalf of a user account or on behalf of another computational mechanism or computational artifact, and thus does not bring human behavior per se within the scope of any embodiment or any claim.

"Digital data" means data in a computing system, as opposed to data written on paper or thoughts in a person's mind, for example. Similarly, "digital memory" refers to a non-living device, e.g., computing storage hardware, not to human or other biological memory.

As used herein, "include" allows additional elements (i.e., includes means comprises) unless otherwise stated.

"Optimize" means to improve, not necessarily to perfect. For example, it may be possible to make further improvements in a program or an algorithm which has been optimized.

"Process" is sometimes used herein as a term of the computing science arts, and in that technical sense encompasses computational resource users, which may also include or be referred to as coroutines, threads, tasks, interrupt handlers, application processes, kernel processes, procedures, or object methods, for example. As a practical matter, a "process" is the computational entity identified by system utilities such as Windows® Task Manager, Linux® ps, or similar utilities in other operating system environments (marks of Microsoft Corporation, Linus Torvalds, respectively). "Process" may also be used as a patent law term of art, e.g., in describing a process claim as opposed to a system claim or an article of manufacture (configured storage medium) claim. Similarly, "method" is used herein primarily as a technical term in the computing science arts (a kind of "routine") but it is also a patent law term of art (akin to a "process"). "Process" and "method" in the patent law sense are used interchangeably herein. Knowledgeable persons will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided. Steps performed automatically are presumed to include at least one operation performed proactively.

Technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment, particularly in real-world embodiment implementations. Data protection operations such as combining 314 classification indicators 304, annotating 520 data transport structures 510, mapping 914 indicators 304 to processing routines 216 and invoking 802 a routine based on the mapping, and many other operations discussed herein (whether recited in the Figures or not), are understood to be inherently digital. A human mind cannot interface directly with a CPU or other processor, or with RAM or other digital storage, to read and write the necessary data to perform the data protection enhancement steps 900 taught herein even in a hypothetical prototype situation, much less in an embodiment's real world large computing environment. This would all be well understood by persons of skill in the art in view of the present disclosure.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

"Based on" means based on at least, not based exclusively on. Thus, a calculation based on X depends on at least X, and may also depend on Y.

Throughout this document, use of the optional plural "(s)", "(es)", or "(ies)" means that one or more of the indicated features is present. For example, "processor(s)" means "one or more processors" or equivalently "at least one processor".

"At least one" of a list of items means one of the items, or two of the items, or three of the items, and so on up to and including all N of the items, where the list is a list of N items. The presence of an item in the list does not require the presence of the item (or a check for the item) in an embodiment. For instance, if an embodiment of a system is described herein as including at least one of A, B, C, or D, then a system that includes A but does not check for B or C or D is an embodiment, and so is a system that includes A and also includes B but does not include or check for C or D. Similar understandings pertain to items which are steps or step portions or options in a method embodiment. This is not a complete list of all possibilities; it is provided merely to aid understanding of the scope of "at least one" that is intended herein.

For the purposes of United States law and practice, use of the word "step" herein, in the claims or elsewhere, is not intended to invoke means-plus-function, step-plus-function, or 35 United State Code Section 112 Sixth Paragraph/Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral, a functional relationship depicted in any of the figures, a functional relationship noted in the present disclosure's text. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, or disclosed as having a functional relationship with the structure or operation of a zac widget, would be deemed part of the structures identified in the application for zac widgets and would help define the set of equivalents for zac widget structures.

This disclosure discusses various data values and data structures, which reside in a memory (RAM, disk, etc.), thereby configuring the memory. This disclosure also discusses various algorithmic steps which are to be embodied in executable code in a given implementation, and such code also resides in memory and effectively configures any general-purpose processor which executes it, thereby transforming it from a general-purpose processor to a special-purpose processor which is functionally special-purpose hardware.

Data structures and data values and code are understood to reside in memory, even when a claim does not explicitly recite that residency for each and every data structure or data value or piece of code mentioned. Accordingly, explicit recitals of such residency are not required. However, they are also not prohibited, and one or two select recitals may be present for emphasis, without thereby excluding all the other data values and data structures and code from residency. Likewise, code functionality recited in a claim is understood to configure a processor, regardless of whether that configuring quality is explicitly recited in the claim.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a computational step on behalf of a party of interest, such as accessing, acquiring, analyzing, anding, annotating, anonymizing, applying, auditing, building, classifying, combining, conforming, defining, deleting, determining, enriching, generating, hashing, ingesting, mapping, oring, performing, presenting, propagating, protecting, pseudonymizing receiving, redacting, reporting, sending (and accesses, accessed, acquires, acquired, etc.) with regard to a destination or other subject may involve intervening action, such as the foregoing or such as forwarding, copying, uploading, downloading, encoding, decoding, compressing, decompressing, encrypting, decrypting, authenticating, invoking, and so on by some other party or mechanism, including any action recited in this document, yet still be understood as being performed directly by or on behalf of the party of interest.

Example verbs listed here may overlap in meaning or even be synonyms; separate verb names do not dictate separate functionality in every case.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other storage device or other computer-readable storage medium is not a propagating signal or a carrier wave or mere energy outside the scope of patentable subject matter under United States Patent and Trademark Office (USPTO) interpretation of the In re Nuijten case. No claim covers a signal per se or mere energy in the United States, and any claim interpretation that asserts otherwise in view of the present disclosure is unreasonable on its face. Unless expressly stated otherwise in a claim granted outside the United States, a claim does not cover a signal per se or mere energy.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory and computer readable storage devices are not propagating signal or carrier wave computer readable media. Unless expressly stated otherwise in the claim, "computer readable medium" means a computer readable storage medium, not a propagating signal per se and not mere energy.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly and individually described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

LIST OF REFERENCE NUMERALS

The following list is provided for convenience and in support of the drawing figures and as part of the text of the specification, which describe items by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

100 operating environment, also referred to as computing environment; includes one or more systems 102

101 machine in a system 102, e.g., any device having at least a processor 110 and a memory 112 and also having a distinct identifier such as an IP address or a MAC (media access control) address; may be a physical machine or be a virtual machine implemented on physical hardware

102 computer system, also referred to as a "computational system" or "computing system", and when in a network may be referred to as a "node"

104 users, e.g., user of an enhanced system 202

106 peripheral device

108 network generally, including, e.g., LANs, WANs, software-defined networks, clouds, and other wired or wireless networks

110 processor or set of processors or processor core; includes hardware

112 computer-readable storage medium, e.g., RAM, hard disks

114 removable configured computer-readable storage medium a.k.a. storage device

116 instructions executable with processor; may be on removable storage media or in other memory (volatile or nonvolatile or both)

118 digital data in a system 102; data structures, values, source code, and other examples are discussed herein

120 kernel(s), e.g., operating system(s), BIOS, UEFI, device drivers; also refers to an execution engine such as a language runtime

122 software tools, software applications; computational

124 software source code; digital

126 display screens, also referred to as "displays"

128 computing hardware not otherwise associated with a reference number 106, 108, 110, 112, 114

130 data classification aka category; used primarily as a noun to indicate a grouping of data or an assigned digital characteristic of data, with a focus on cybersecurity (privacy is an aspect of cybersecurity), but 130 also refers to the computational activity of assigning a classification to data

132 data taxonomy; digital

134 data structure which documents, represents, or otherwise serves in a computing system as a definition of a taxonomy 132

136 cloud, also referred to as cloud environment or cloud computing environment

202 enhanced computing system, i.e., system 102 enhanced with taxonomy-agnostic data protection functionality 204 as taught herein

204 taxonomy-agnostic data protection functionality (also referred to as or encompassing the FIG. 2 functionality to access a taxonomy-agnostic protection framework, and as functionality 204), e.g., software or specialized hardware which performs or is configured to perform steps 702 and 704 and 706, or steps 702 and 710, or steps 516 and 802, or step 914, or step 520, or any software or hardware which performs or is configured to perform a novel method 900 or a computational data protection activity first disclosed herein

206 computationally access a framework 212 or portion thereof, e.g., via an API

208 characteristic of being taxonomy-agnostic, also referred to as taxonomy-neutral, in a computing system, meaning interoperable with a variety of taxonomies including future taxonomies, as opposed to having a particular taxonomy embedded; a taxonomy-agnostic framework can operate with different taxonomies without recompiling or rebuilding the taxonomy-agnostic framework, in contrast to infrastructure that must be recompiled or otherwise rebuilt to change an embedded taxonomy

210 data protection generally, as implemented in a computing system, e.g., cybersecurity protection (privacy is an aspect of cybersecurity)

212 taxonomy-agnostic data protection framework, also referred to an a taxonomy infrastructure or model; in conjunction with a taxonomy definition 134 and data processing routines 216, the framework 212 implements data protection

210 in a computing system

214 static analysis; computational activity, or a digital result thereof

216 data processing routine, e.g., redactor; computational, digital

218 mapping mechanism which maps taxonomy classifications 130 (represented by indicators 304) and processing routines 216 to one another in a computing system

220 static analysis tool; software

302 computationally defining one or more aspects of a framework 212

304 data classification indicator; digital

308 data transport structure; data structure in a system 102

310 computationally generate a suggestion 312

312 suggestion for annotating source code with an indicator 304 annotation 438; digital

314 computationally combine classifications 130, or a digital result of such computational activity

316 rule for combining classifications, as represented in a computing system

318 default routine 216, also referred to as fallback routine

320 computationally audit an annotated source code, data transport logs, or routine invocation 802 logs; 320 also refers to a digital result of such activity

322 software tool which upon execution performs auditing

324 interface in a computing system 102

402 taxonomy indicator; digital

404 bit vector; digital

406 position in a bit vector, or particular bit in a bit vector; digital

408 correspondence 528 between data classifications 130 and data classification indicators 304, as represented in or utilized by a compiler

410 conflict between two classifications or two classification processing routines, as represented in a computing system, e.g., a classification "public" conflicts with a classification "company confidential", and a routine which enriches data conflicts with a routine which deletes data

412 computationally resolving a conflict 410, or a digital result of such computational activity

414 rule for resolving 412 a conflict 410, as represented in a computing system

416 sidecar file, e.g., a file that stores data (e.g., metadata) not supported by the format of a source code file

418 dictionary data structure, e.g., a key-pair data structure

420 database in a computing system

422 callback, e.g., a computational routine X that is passed into a routine Y and then called from inside Y

424 hashing, e.g., one-way computational conversion of varied length identifiers int a fixed length numeric value

426 enrichment, e.g., computationally associating additional data with a piece of data

428 redaction, e.g., deletion or encryption or hashing; computational

430 encryption; computational

432 deletion, also referred to as erasure; computational

434 anonymization, by computationally removing identifying data by other than deletion or encryption, e.g., by hashing or by overwriting the identifying data with asterisks or another character

436 pseudonymization, by computationally removing identifying data by overwriting the identifying data with a pseudonym value

438 annotation aka tag, e.g., text form of a data classification indicator suitable for use in source code, or data transport structure form of a data classification indicator suitable for use in conforming 526 data for transport

502 computationally build a program, e.g., using compilation, linking

504 example program which propagates 902 a data classification internally when moving data between variables or other storage locations during program execution; software

506 computational ingestion of data by a program, e.g., via an API or user interface or network interface or file system interface or by generating the data internally within the program

508 sensitive data, aka classified data; a subset of data 118 generally

510 data transport structure, e.g., structure which enforces a data transport protocol or an encoding used in data transport

512 computationally conform data to a data transport structure, e.g., by populating fields of the data transport structure with excerpts from the data or otherwise based on data that is being conformed; the original copy of the data may be replaced by or supplemented with the conformant copy

514 computationally send data, e.g., via a network API

516 computationally receive data, e.g., via a network API

518 example program which receives classified data and receives or infers from the received data a data classification, as opposed to repeating computational work previously done elsewhere to assign the data to a classification; software

520 computationally annotate a data transport structure with a data classification indicator or otherwise embed data classification information in the data transport structure

522 programming language data type, as represented in a computing system

524 data format, as represented in a computing system

528 correspondence between data classifications 130 and data classification indicators 304, e.g., mapping of a particular classification representing GDPR restricted data to a particular bit such as bit7 in a bit vector or to a particular annotation such as "[GDPRRES]" in a source code

602 front-end of framework 212 in a computing system

604 back-end of framework 212 in a computing system; front-end and back-end may be on same machine 101 or on different respective machines 101

700 flowchart; 700 also refers to front-end data protection methods that are illustrated by or consistent with the FIG. 7 flowchart

702 computationally access a data protection framework 212, e.g., by installing or modifying or reading a data classification taxonomy definition 134

704 computationally perform a static analysis 214 which assesses data classification propagation in a source code based at least in part on annotations or other indicators 304 as well as portions of the source code itself, e.g., data flow such as variable declarations, variable assignments, and routine calls

706 computationally report a result 708 of the static analysis 214, e.g., by configuring a user interface or via an API

708 static analysis result aka determination, as represented in a computing system, e.g., a conclusion of propagation 902 accuracy and scope or particular details illustrating such a conclusion

710 computationally annotate a source code with an annotation 438, e.g., by inserting annotation text in the source code

800 flowchart; 800 also refers to back-end data protection methods that are illustrated by or consistent with the FIG. 8 flowchart

802 computationally invoke a processing routine 216; selection of the routine in order to invoke it is implied

900 flowchart; 900 also refers to data protection methods that are illustrated by or consistent with the FIG. 9 flowchart, which incorporates the FIG. 7 flowchart and the FIG. 8 flowchart and other steps taught herein

902 computationally propagate data classification, e.g., within a source code via annotation or within an executable program consistent with annotations or other indicators 304

904 computationally acquire an automatically generated suggestion 908, e.g., via an API

906 computationally present a suggestion 908 by configuring a user interface

908 suggestion for an annotation, as represented in a computing system 910 computationally perform an action 912

912 data protection action in a computing system

914 computationally map between data classification processing routines 216 and data classification indicators 304, or data structure representing such mapping; changing the mapping may be done by changing the set of mapped routines, changing the set of mapped indicators, or changing which routine is mapped with which indicator, or a combination of the foregoing

916 computationally apply a particular data classification to particular data, e.g., by annotating a variable or other container of the data or by annotating a data transport structure for transporting the data

918 any step or item discussed in the present disclosure that has not been assigned some other reference numeral; 918 may thus be shown expressly as a reference numeral for various steps or items or both, and may be added as a reference numeral (in the current disclosure or any subsequent patent application which claims priority to the current disclosure) for various steps or items or both without thereby adding new matter

CONCLUSION

In some embodiments, a taxonomy-agnostic data protection framework 212 includes a plugged-in data classification taxonomy definition 134 having a taxonomy identifier 402 and a set of data classification indicators 304 such as annotations 438. The taxonomy-agnostic data protection framework 212 also includes a plugged-in set of data classification processing routines 216, and a plugged-in mapping mechanism 218 which maps 914 between data classification processing routines and data classification indicators. The framework facilitates efficient, accurate, and thorough implementation of data classification 130 propagation 902 per the plugged-in taxonomy 132, both within a given program and between programs that connect over a network 108. The framework also facilitates flexible implementation of per-taxonomy data protection actions 912 such as deletion, redaction, encryption, anonymization, pseudonymization, hashing, or enrichment, in response to individual or combined data classification indicators 304. Static analysis 214 of annotated source code 124 determines whether data classifications 130 are accurately and comprehensively propagated 902 with a program.

Embodiments are understood to also themselves include or benefit from tested and appropriate security controls and privacy controls such as the General Data Protection Regulation (GDPR). Use of the tools and techniques taught herein is compatible with use of such controls.

Although Microsoft technology is used in some motivating examples, the teachings herein are not limited to use in technology supplied or administered by Microsoft. Under a suitable license, for example, the present teachings could be embodied in software or services provided by other cloud service providers.

Although particular embodiments are expressly illustrated and described herein as processes, as configured storage media, or as systems, it will be appreciated that discussion of one type of embodiment also generally extends to other embodiment types. For instance, the descriptions of processes in connection with the Figures also help describe configured storage media, and help describe the technical effects and operation of systems and manufactures like those discussed in connection with other Figures. It does not follow that any limitations from one embodiment are necessarily read into another. In particular, processes are not necessarily limited to the data structures and arrangements presented while discussing systems or manufactures such as configured memories.

Implementation details of a given embodiment may pertain to specific code, such as specific thresholds, comparisons, specific kinds of platforms or programming languages or architectures, specific scripts or other tasks, and specific computing environments, and thus need not appear in every embodiment. Program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

With due attention to the items provided herein, including technical processes, technical effects, technical mechanisms, and technical details which are illustrative but not comprehensive of all claimed or claimable embodiments, note that the present disclosure and the embodiments described herein are not directed to subject matter outside the technical arts, or to any idea of itself such as a principal or original cause or motive, or to a mere result per se, or to a mental process or mental steps, or to a business method or prevalent economic practice, or to a mere method of organizing human activities, or to a law of nature per se, or to a naturally occurring thing or process, or to a living thing or part of a living thing, or to a mathematical formula per se, or to isolated software per se, or to a merely conventional computer, or to anything wholly imperceptible or any abstract idea per se, or to insignificant post-solution activities, or to any method implemented entirely on an unspecified apparatus, or to any method that fails to produce results that are useful and concrete, or to any preemption of all fields of usage, or to any other subject matter which is ineligible for patent protection under the laws of the jurisdiction in which such protection is sought or is being licensed or enforced.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable storage medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; functionality modules can be defined in various ways in a given implementation without necessarily omitting desired technical effects from the collection of interacting modules viewed as a whole. Distinct steps may be shown together in a single box in the Figures, due to space limitations or for convenience, but nonetheless be separately performable, e.g., one may be performed without the other in a given performance of a method.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a", "an", and "the" are inclusive of one or more of the indicated item or step. In particular, in the claims a reference to an item generally means at least one such item is present and a reference to a step means at least one instance of the step is performed. Similarly, "is" and other singular verb forms should be understood to encompass the possibility of "are" and other plural forms, when context permits, to avoid grammatical errors or misunderstandings.

Headings are for convenience only; information on a given topic may be found outside the section whose heading indicates that topic.

All claims and the abstract, as filed, are part of the specification. The abstract is provided for convenience and for compliance with patent office requirements; it is not a substitute for the claims and does not govern claim interpretation in the event of any apparent conflict with other parts of the specification. Similarly, the summary is provided for convenience and does not govern in the event of any conflict with the claims or with other parts of the specification. Claim interpretation shall be made in view of the specification as understood by one of skill in the art; it is not necessary to recite every nuance within the claims themselves as though no other disclosure was provided herein.

To the extent any term used herein implicates or otherwise refers to an industry standard, and to the extent that applicable law requires identification of a particular version of such as standard, this disclosure shall be understood to refer to the most recent version of that standard which has been published in at least draft form (final form takes precedence if more recent) as of the earliest priority date of the present disclosure under applicable patent law.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A data protection method performed by a computing system, the method comprising:

accessing a taxonomy-agnostic data protection framework of the computing system, the taxonomy-agnostic data protection framework comprising a data classification taxonomy definition, the data classification taxonomy definition comprising a taxonomy identifier and a set of data classification indicators, the taxonomy-agnostic data protection framework configured to be interoperable with a future data classification taxonomy definition as a result of the future data classification taxonomy definition being plugged into the taxonomy-agnostic data protection framework without recompiling or rebuilding the taxonomy-agnostic data protection framework;

performing a static analysis of a source code based on at least the data classification indicators; and reporting at least one of the following determinations based on at least a result of the static analysis: the source code correctly propagates a particular data classification, the source code does not correctly propagate a particular data classification, or the source code does not apply a particular data classification to particular data even though the particular data has a data type or a data format which is compatible with the particular data classification.

2. The method of claim 1, further comprising generating an annotated data transport structure by annotating a data transport structure with a particular data classification indicator, and sending data over a network connection, wherein the data conforms to the annotated data transport structure.

3. The method of claim 1, further comprising receiving data, generating annotated data by annotating the data with a particular data classification indicator, and forwarding the annotated data over a network connection.

4. The method of claim 1, further comprising acquiring an automatically generated data annotation suggestion to annotate a part of the source code with a particular data classification indicator, and presenting the automatically generated data annotation suggestion in a user interface.

5. The method of claim 1, further comprising receiving sensitive data which is annotated with a particular data classification indicator, using a mapping mechanism to identify a particular data classification processing routine based on at least the particular data classification indicator, and invoking the particular data classification processing routine on the sensitive data.

6. The method of claim 5, further comprising mapping a data classification annotation on the sensitive data to multiple data classifications in the data classification taxonomy definition.

7. The method of claim 5, further comprising auditing and reporting which data classification processing routines were invoked for a specified set of data.

8. The method of claim 1, further comprising resolving a conflict between data classification annotations.

9. The method of claim 1, wherein accessing the taxonomy-agnostic data protection framework comprises:

reading at least a portion of the data classification indicators from at least one of: source code annotations, a sidecar file, an online database, or a compiler-based mapping.

10. The method of claim 1, further comprising:

using a particular data classification indicator to identify a default processing routine.

11. The method of claim 1, further comprising:

corresponding a particular data classification indicator to a bit position in a bit vector.

12. The method of claim 1, wherein performing the static analysis of the source code comprises:

determining that the source code correctly propagates the particular data classification.

13. The method of claim 1, wherein performing the static analysis of the source code comprises:

determining that the source code does not correctly propagate the particular data classification.

14. The method of claim 1, wherein performing the static analysis of the source code comprises:

determining that the source code does not apply the particular data classification to the particular data.

15. The method of claim 1, further comprising:

combining at least two data classification indicators to produce another data classification indicator.

16. A computer-readable storage device storing instructions which upon execution by a processor cause a computing system to perform operations, the operations comprising:

accessing a taxonomy-agnostic data protection framework of the computing system, the taxonomy-agnostic data protection framework comprising a data classification taxonomy definition, the data classification taxonomy definition comprising a taxonomy identifier and a set of data classification indicators, the taxonomy-agnostic data protection framework configured to be interoperable with a future data classification taxonomy definition as a result of the future data classification taxonomy definition being plugged into the taxonomy-agnostic data protection framework without recompiling or rebuilding the taxonomy-agnostic data protection framework; and annotating a source code based on at least one of the data classification indicators.

17. The computer-readable storage device of claim 16, wherein the taxonomy-agnostic data protection framework further comprises:

a set of data classification processing routines; and a mapping mechanism which maps between data classification processing routines and data classification indicators; and wherein the operations further comprise:

invoking a particular data classification processing routine on particular data based at least in part on a particular data classification indicator which is associated with the particular data.

18. The computer-readable storage device of claim 17, wherein the operations further comprise:

performing at least one of the following actions on the particular data using the particular data classification processing routine: deletion, redaction, anonymization, pseudonymization, or hashing.

19. The computer-readable storage device of claim 17, wherein the operations further comprise:

performing at least one of the following actions on the particular data using the particular data classification processing routine: encryption or enrichment.

20. The computer-readable storage device of claim 17, wherein the operations further comprise:

auditing multiple invocations of data classification processing routines; and reporting a result of the auditing.

21. A system comprising:

a processor system; and a memory that stores computer-executable instructions that are executable by the processor system to at least:

access a taxonomy-agnostic data protection framework of the computing system, the taxonomy-agnostic data protection framework comprising a plurality of data classification taxonomy definitions of a plurality of respective data classification taxonomies, the plurality of data classification taxonomy definitions comprising a plurality of respective data classification indicators that correspond to a plurality of respective per-taxonomy data protection actions, the plurality of data classification taxonomy definitions comprising a data classification taxonomy definition that comprises a taxonomy identifier and a set of data classification indicators that includes a respective data classification indicator from the plurality of respective data classification indicators;

perform a static analysis of a source code based on at least the data classification indicators; and report at least one of the following determinations based on at least a result of the static analysis: the source code correctly propagates a particular data classification, the source code does not correctly propagate a particular data classification, or the source code does not apply a particular data classification to particular data even though the particular data has a data type or a data format which is compatible with the particular data classification.

22. The system of claim 21, wherein the computer-executable instructions are executable by the processor system further to at least:

generate an annotated data transport structure by annotating a data transport structure with a particular data classification indicator; and send data, which conforms to the annotated data transport structure, over a network connection.

23. The system of claim 21, wherein the computer-executable instructions are executable by the processor system further to at least:

generate annotated data by annotating received data with a particular data classification indicator; and forward the annotated data over a network connection.

24. The system of claim 21, wherein the computer-executable instructions are executable by the processor system further to at least:

acquire an automatically generated data annotation suggestion to annotate a part of the source code with a particular data classification indicator; and present the automatically generated data annotation suggestion in a user interface.

25. The system of claim 21, wherein the computer-executable instructions are executable by the processor system further to at least:

receive sensitive data that is annotated with a particular data classification indicator;

use a mapping mechanism to identify a particular data classification processing routine based on at least the particular data classification indicator; and invoke the particular data classification processing routine on the sensitive data.

26. The system of claim 25, wherein the computer-executable instructions are executable by the processor system further to at least:

map a data classification annotation on the sensitive data to multiple data classifications in the data classification taxonomy definition.

27. The system of claim 25, wherein the computer-executable instructions are executable by the processor system further to at least:

audit and report which data classification processing routines are invoked for a specified set of data.

* * * * *